(12) United States Patent
Lu et al.

(10) Patent No.: US 12,529,877 B2
(45) Date of Patent: *Jan. 20, 2026

(54) MAGNIFICATION SCOPE AND ANALYSIS TOOLS

(71) Applicant: H2Ok Innovations Inc., Millbrae, CA (US)

(72) Inventors: David Yang Lu, Millbrae, CA (US); Annie Jieying Lu, Millbrae, CA (US); Lin Zhu, Boston, MA (US); Anurag Mitra, Kolkata (IN)

(73) Assignee: H2Ok Innovations Inc., Millbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,642

(22) Filed: May 20, 2024

(65) Prior Publication Data

US 2025/0060574 A1 Feb. 20, 2025

Related U.S. Application Data

(63) Continuation of application No. 17/168,775, filed on Feb. 5, 2021, now Pat. No. 12,025,786.

(Continued)

(51) Int. Cl.
*G02B 21/02* (2006.01)
*G02B 21/00* (2006.01)
(Continued)

(52) U.S. Cl.
CPC ....... *G02B 21/025* (2013.01); *G02B 21/0008* (2013.01); *G02B 21/06* (2013.01); *G06T 7/0012* (2013.01); *G06T 2207/10056* (2013.01)

(58) Field of Classification Search
CPC .. G02B 21/025; G02B 21/0008; G02B 21/06; G06T 7/0012; G06T 2207/10056
See application file for complete search history.

(56) References Cited

U.S. PATENT DOCUMENTS 9,057,702 B2   6/2015   Ozcan et al.
9,195,898 B2   11/2015  Huang et al.
(Continued)

FOREIGN PATENT DOCUMENTS

CN   202886724 U   4/2013
CN   103994718 A   8/2014

OTHER PUBLICATIONS

Science Buddies Staff. "Picture This: Building a Cell Phone Microscope" Science Buddies. Science Buddies, Jan. 22, 2016) (Year: 2016).*

(Continued)

*Primary Examiner* — Amara Abdi
(74) *Attorney, Agent, or Firm* — Wolf, Greenfield & Sacks, P.C.

(57) ABSTRACT

A portable variable focus microscope includes a housing having a lower section and an upper section secured together. A lens is removably disposed on at least one lens retention feature of the upper section. The scope further includes a slide platform and a height adjuster, where rotation of the height adjuster within the scope housing adjusts a relative distance between the slide platform and the lens to adjust a focus of the lens. The scope may be used in conjunction with a mobile data device to capture an image of a sample on a slide received in the scope. A program including a CNN algorithm may be employed to identify contaminants in the sample.

20 Claims, 18 Drawing Sheets

Related U.S. Application Data

(60) Provisional application No. 62/971,286, filed on Feb. 7, 2020.

(51) Int. Cl.
    *G02B 21/06*     (2006.01)
    *G06T 7/00*     (2017.01)

(56) References Cited

U.S. PATENT DOCUMENTS

| | | | |
|---|---|---|---|
| 9,696,535 | B2 | 7/2017 | Prakash et al. |
| 9,743,020 | B2 | 8/2017 | Zheng et al. |
| 9,835,842 | B2 | 12/2017 | Fan |
| 10,036,881 | B2 * | 7/2018 | Schweitzer ............ H04N 23/55 |
| 11,449,363 | B2 | 9/2022 | Matveev et al. |
| 12,025,786 | B2 | 7/2024 | Lu et al. |
| 2010/0075373 | A1 * | 3/2010 | Hoyt ........................ G01N 1/31 |
| | | | 435/40.5 |
| 2011/0294543 | A1 | 12/2011 | Lapstun et al. |
| 2017/0160534 | A1 * | 6/2017 | Fan ..................... G02B 21/361 |
| 2017/0227757 | A1 * | 8/2017 | Lin ....................... G02B 13/001 |
| 2018/0176578 | A1 * | 6/2018 | Rippel ............. G06V 30/19173 |
| 2018/0342322 | A1 * | 11/2018 | Apte ....................... G16H 20/00 |
| 2021/0182676 | A1 | 6/2021 | Zlateski et al. |
| 2021/0216746 | A1 * | 7/2021 | Nie ....................... G06V 20/698 |
| 2021/0247602 | A1 | 8/2021 | Lu et al. |

OTHER PUBLICATIONS

Corley, (A Cell-Phone Microscope for Disease Detection, Jul. 23, 2009, Biomedicine) (Year: 2009).

Cybulski et al., "Foldscope: Origami-Based Paper Microscope," PLOS ONE, Jun. 2014, vol. 9, issue 6, www.plosone.org.

Jeesangho, "Multiple Magnification Glass Bead Microscope," Thingiverse, https://www.thingiverse.com/thing:3606346, accessed Dec. 4, 2020.

Kim et al., "LudusScope: Accessible Interactive Smartphone Microscopy for Life-Science Education," PLOS ONE, DOI: 10.1371/journal.pone.0162602, Oct. 5, 2016.

Strauss, "Diple Smartphone Microscope Review: A Bargain-Priced Optical Powerhouse," Technabob, https://technabob.com/blog/2019/12/15/diple-smartphone-microscope-re.

Sung et al., "Open-source do-it-yourself multi-color fluorescence smartphone microscopy," Biomedical Optics Express 5075, vol. 8, No. 11, Nov. 1, 2017.

* cited by examiner

MAGNIFICATION SCOPE AND ANALYSIS TOOLS

CROSS REFERENCE TO RELATED APPLICATIONS

The present application claims the benefit under 35 U.S.C. § 120 as a continuation of U.S. patent application Ser. No. 17/168,775, filed Feb. 5, 2021, and entitled "MAGNIFICATION SCOPE AND ANALYSIS TOOLS", which claims the benefit of U.S. Provisional Application No. 62/971,286, titled MAGNIFICATION SCOPE, SENSORS, AND ANALYSIS TOOLS, filed Feb. 7, 2020, each of which is herein incorporated by reference in their entirety.

FIELD OF THE DISCLOSURE

The present disclosure relates generally to a magnification scope and sample analysis tools and image recognition algorithms for analyzing microscopic organisms and other contaminants, or materials, in liquid or solid samples. The present disclosure additionally relates to integrated microscopy, sensors, data collection, and analysis systems. In some embodiments, these are both used in combination or are used alone.

BACKGROUND OF THE DISCLOSURE

In many monitoring, diagnosis, and data collection processes, samples need to be collected from a source and shipped to a lab. Such samples, such as water quality testing samples, can be collected from industrial facilities, from buildings and institutional facilities, from transportation systems, from private and home water sources or from public water sources, wells, ponds, lakes, reservoirs, oceans, etc. It is understood that water sources generally are never free from contaminants, but it is the type and concentration of such contaminants that is important for determinations of: whether the water is safe for humans or other life types; how to treat the water; production yield and quality of a product; and/or effects on natural or man-made processes and operations. In other examples, samples can be any type of liquid or solid able to be placed on a slide.

The sample is analyzed under a microscope by lab operators and results are reported. As a result, not only is this process centralized, technical, and costly, but it also leads to an extended delay time, ranging from days to weeks, between when the sample is collected and when the results are returned. Moreover, the equipment necessary to analyze the samples are often expensive to purchase, require a substantial amount of training to use, and require a large support staff to maintain. Thus, these factors create limited applicability in large scale data collection efforts.

In one example, current methods of tracking harmful algal blooms (HABs), such as cyanobacteria, within water sources involve citizens reporting a possible concern, a trained scientist coming to the reported site and taking a water sample, the water sample being transported back to a lab to be studied under a microscope, and then finally reporting on whether the water sample is or is not contaminated with cyanobacteria and if the water source needs to be restricted from contact. As noted above, this is a costly process that often takes days or even weeks, and when the results are determined, the cyanobacteria bloom could have moved or changed in size, and people could have already been exposed to the contaminated water source. Furthermore, due to the delay in processing results, there is a lack of real time data on cyanobacteria and blooms across water sources. This lack of real time data inhibits the ability for organizations and individuals to locate harmful algal blooms, as well as predict the growth and movement of various types of harmful algal blooms.

In another example, wastewater treatment workers, especially in smaller and less equipped facilities, may collect water samples on a regular basis. Those samples are then sent to a lab or consultant for analysis of the microbiological activity inside the wastewater treatment process. A specific bacteria that is commonly looked for is filamentous bacteria, which when in excess, can cause the wastewater treatment process to decrease in efficiency through bulking, by preventing sludge from settling. However, due to the long turn-around time in sending samples out for analysis, by the time the results are returned to the facility workers, the bulking often has already occurred, and operations may have even needed to be stopped.

Additionally, current magnification tools such as optical microscopes are heavy, large, and expensive, and they still need to be operated by trained microbiologists in order to be used for data collection and sample analysis.

Further still, current processes of collecting water samples also result in a reactive model for contaminant management. Because the sampling and analysis are not real time, contaminants are treated often after they already occur and pose a health hazard to the community. Contaminant testing and liquid system management is fragmented and there is no ecosystem for real time contaminant data collection and analysis.

SUMMARY OF THE DISCLOSURE

Thus, there is a need in the industry for an inexpensive and easy to disseminate system for the identification and data collection of contaminants, including but not limited to microscopic materials, harmful bacteria (including filamentous bacteria, legionella, E. coli, salmonella, etc.), algal, mold, diseases, pathogens, plastics, particles, and other harmful chemicals in bodies of water or other liquids, on surfaces, in piping, and in the environment. The system may comprise an inexpensive, easy to use, in-situ magnification and analysis tool for self-diagnosis, data collection, environmental monitoring, safety and public health monitoring, testing, education, etc. Such a tool also needs to be able to aggregate data based on these tests in real time. A tool with these capabilities can help track and predict the movement and spread of disease, pollution, or microscopic material across regions. This can provide warnings and give insights to individuals and organizations to make cost saving, time saving, and healthier decisions.

The present disclosure can be applied to the fields of magnification, imaging, and identification of samples at the microscopic scale, monitoring of chemicals, biological matter, and environmental properties in real time, and analysis of data for smart decisions on contaminant management and contaminant prediction, as well as operation optimizations. The instant system and methods can, in some embodiments, be used in the fields of water quality monitoring, environmental monitoring, contaminant monitoring, industrial production process analysis, healthcare, education, quality control, manufacturing, institutional buildings, transportation, diagnosis, and more. Some possible specific applications are, for example but not limited to, the identification and data collection of cyanobacteria and the monitoring of harmful algal blooms, the identification of disease causing microbes in drinking water and on surfaces, the diagnosis of melanoma in patients, detection of microplastics, rapid testing for *E. coli* and *salmonella* for food safety, diagnosis of *legionella*, and monitoring of air allergens like pollen in the environment.

An object of the instant disclosure is an improved monitoring, diagnosis, and data collection system and method. The instant method and system can be applied to the fields of magnification, imaging, and identification of samples at the microscopic scale, monitoring of chemicals and environmental properties in real time, analysis of data for smart decisions on contaminant management, contaminant prediction, process optimization, and risk mitigation.

Another objective of this disclosure can be to provide a tool and method to allow for real time data collection, sampling, and analysis of materials and organic compounds at a microscopic scale.

An additional objective is to aid in the data collection and testing of microbiological contaminants, bacteria, and pollutants within the environment. For example, an objective can be to aid in the data collection efforts to monitor, understand, and predict cyanobacteria and harmful algal blooms by providing civilians the ability to not only test for the bacteria, but also receive and upload results in real time. The data can be mapped and displayed to show live results of areas with contamination, as well as used to help understand and predict bacteria growth.

Another objective is to aid in the collection of data on microplastic pollution and pollen, as well as monitor their presence throughout the environment.

Yet another alternative objective can be for the identification and data collection of filamentous bacteria for various settings including, but not limited to, wastewater treatment plants and paper manufacturing plants. For example, understanding the filamentous and microbiological make up of water used in the paper manufacturing process is important, as the presence of filamentous can degrade the quality of the paper being produced. Thus, it is of high importance to be able to quickly and regularly monitor the water being used in pulp and paper manufacturing plants.

An additional objective is assisting in the detection and identification of *legionella* bacteria and other disease causing organisms and materials. The identification of these organisms and materials can be important in the institutional sector where *legionella* can pose a significant health risk.

A further objective can include the collection of images of a sample using a scope and a mobile digital data device. After collecting the image using a camera module on the mobile digital data device, an image recognition algorithm can be run on the mobile digital data device to determine the presence of a foreign body in the sample. This algorithm can be run on the mobile digital data device without the need for an active connection to a wireless, or wired, network. This image recognition machine learning algorithm can replace the need for a trained scientist to manually classify and analyze contaminants collected in field samples, allowing for real-time diagnostics.

Other objects, features, and advantages of the disclosure shall become apparent as the description thereof proceeds when considered in connection with the accompanying illustrative drawings.

BRIEF DESCRIPTION OF THE DRAWING FIGURES

The novel features which are characteristic of the present invention are set forth in the appended claims. However, the disclosure's preferred embodiments, together with further objects and attendant advantages, will be best understood by reference to the following detailed description taken in connection with the accompanying drawings in which:

DETAILED DESCRIPTION OF THE EXEMPLARY EMBODIMENTS

Figure 1:
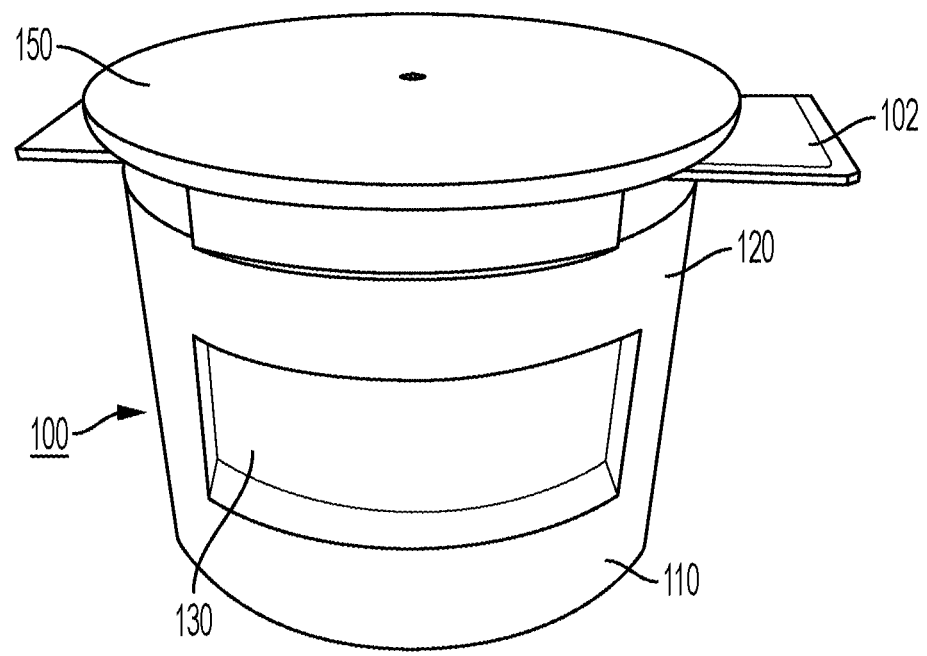
Fig. 1 shows a front perspective view of a mobile scope according to a first embodiment.
Figure 2:
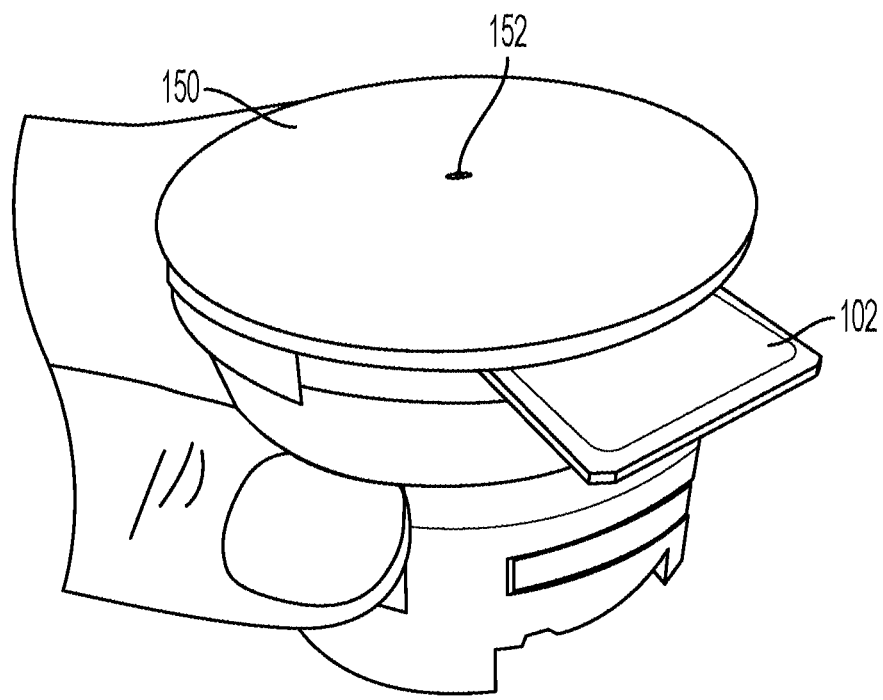
FIG. 2 shows a top perspective view of the mobile scope of Fig. 1.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal. Moreover, while reference is made throughout of a sample being a liquid, it is understood that the sample being analyzed may be in any phase and the contaminants, or materials of interest, can be any known, or unknown contaminants, or material, which may be distinct in a given environment.

The present disclosure generally provides a mobile variable focus microscope, scope, or magnification device; an algorithm for use with the scope; and an algorithm for data aggregation and analysis for use alone or in combination with the scope.

A first exemplary embodiment, as seen in FIGS. 1-14, can generally include a glass bead microscope, mobile scope, or scope 100. The mobile scope 100, for example a glass bead microscope, can attach to a mobile digital data device 200, or an image capture and processing device (e.g., a mobile phone, a tablet, etc.). In one alternative, in place of the mobile digital data device, any digital camera can be used to capture an image of the sample 102 through the lens 150. In a further alternative, the mobile scope 100 can be used with the naked eye to view a sample 102 through the lens 150. Advantageously, the instant mobile scope 100 can be lightweight and handheld; thus the scope 100 itself can be brought directly into the field, and/or the site of the sample collection. For example, the scope 100 can be sized and shaped to be easily brought to a waterway by a non-expert observer to obtain a water sample on a conventional laboratory sample slide and thereby view the water quality. The sample 102 can be viewed with the naked eye, as noted above, or can be viewed with the mobile digital data device 200 to capture a digital image of the sample for further analysis, as will be discussed below.

Figure 19:
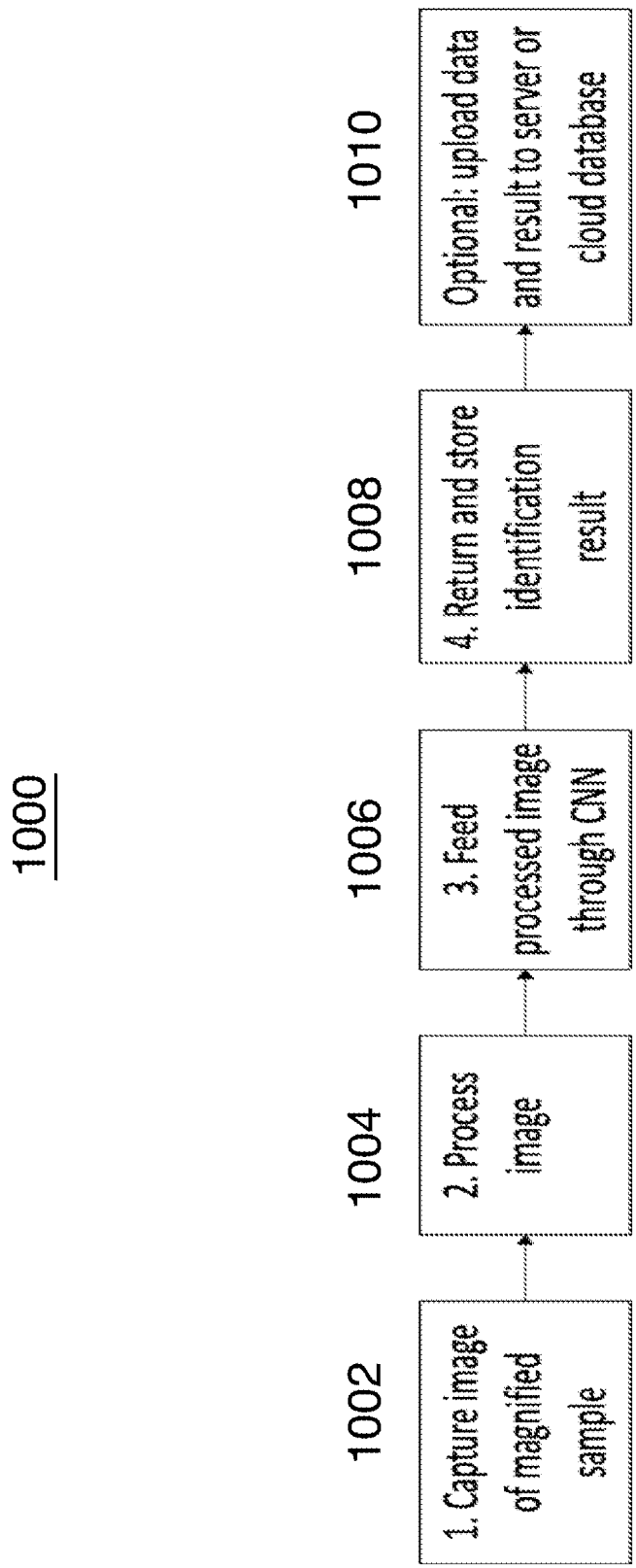
FIG. 19 shows a first exemplary algorithm.
Figure 20:
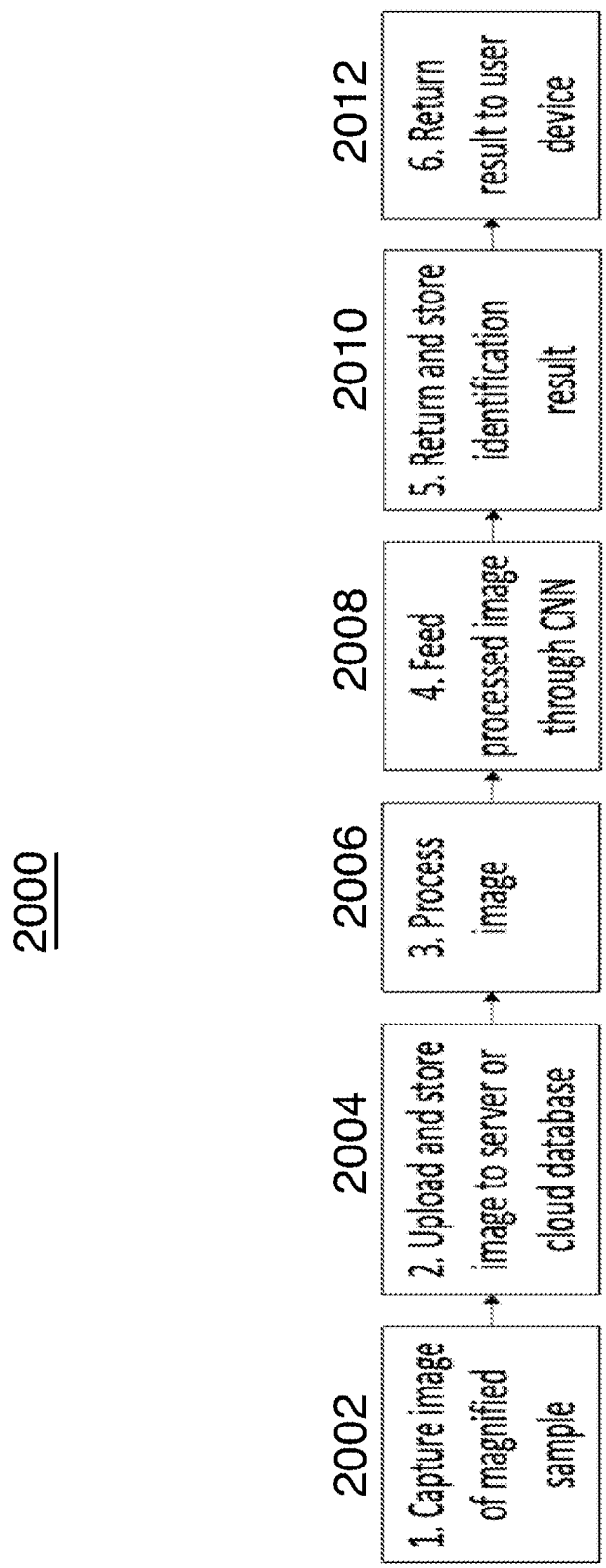
FIG. 20 shows an alternative exemplary algorithm.

In some embodiments, a computer program can be downloaded and installed on the mobile digital data device 200 to allow for remote analysis of the samples 102. For example, a program 1000, 2000, as seen in FIGS. 19 and 20, can be capable of image recognition and processing of qualitative analysis such as classification of the type of a sample captured under the scope, as well as possible quantitative analysis for aspects such as concentration and cell count, as will be further discussed below. In some embodiments, the computer program 1000, 2000 can be installed on the mobile digital data device 200 that is used in conjunction with the mobile scope 100. Alternatively, an image captured with the physical scope 100 can be wirelessly, or wiredly, transferred to a second device for processing with the aforementioned computer program.

In an embodiment, the mobile scope 100 can consist of four major components: (1) a magnification lens, lens component, or lens 150, 300, (2) a sample platform component 140, (3) a height adjustment, or focus adjustment, component 130, and (4) a light source and light modification component 160. These components can be separated into smaller segments or combined as a single segment and ordered in various ways. The scope 100 can be attached onto the mobile digital data device 200, for example a cell phone camera system, through physical clamps, cases, adhesives, magnetism, and more. Alternatively, as illustrated, the scope 100 can be placed onto the mobile digital data device 200 and manually held in place without any physical connectors. The advantage to manually holding the scope 100 together with mobile digital data device 200 is that a manual alignment arrangement can avoid issues of compatibility between devices of various sizes and shapes. For example, the instant scope 100 can easily be used with a cell phone, a tablet computer, or a webcam without the need for further modification of the scope itself This greatly increases the adaptability of the instant scope 100 as it is mobile digital data device agnostic.

The scope 100 itself can be constructed from various materials including but not limited to plastic, polymers, metals, ceramics, wood, paper, etc. In the illustrated embodiment, each of the components are manufactured via additive manufacturing methods, for example using conventional 3D filament printing, or other equivalents thereof. Alternatively, the components can be manufactured via any known methods, including various molding methods and other additive or subtractive manufacturing methods.

In general, the scope 100 can include a plurality of pieces which form the general assembly. In the illustrated embodiment, the scope can include scope housing 100, which can include a lower section 110 secured to an upper section 120. The lower and upper sections 110, 120, can be secured together via interference fit to form an interior lumen 111 for a slide platform 140 and a height adjuster 130. The slide platform 140 can be inserted downward into the lumen 111 from a top-most face 122 of the upper section 120 and partially received in an interior screw thread 132 ofthe height adjuster 130. The slide platform 140 can be rotationally fixed within the upper section 120 while allowing axial movement of the slide platform 140 within the lumen 111. The height adjuster 130 can be axially fixed within the lumen 111 defined by the upper and lower sections, 110, 120 while being freely rotatable. Rotation of the height adjuster 130 can permit the slide platform 140 to axially move up or down within the lumen 111 ofthe scope 100. The unique assembly of the instant scope allows for easy replacement of the various parts of the scope in the event that they are damaged or worn.

Figure 5:
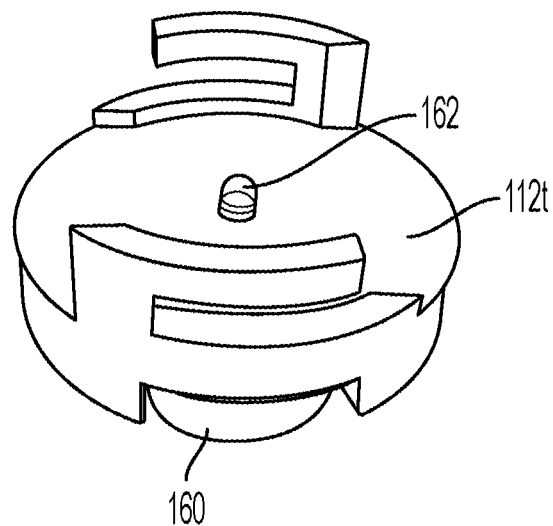
FIG. 5 shows a top perspective view of the lower portion of the mobile scope of Fig. 1 with an LED installed.
Figure 8:
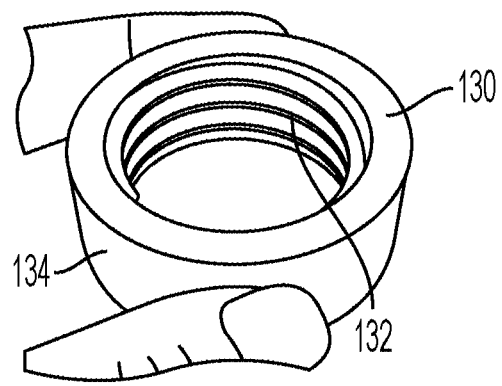
FIG. 8 shows a perspective view of the height adjuster of the mobile scope of Fig. 1.
Figure 6:
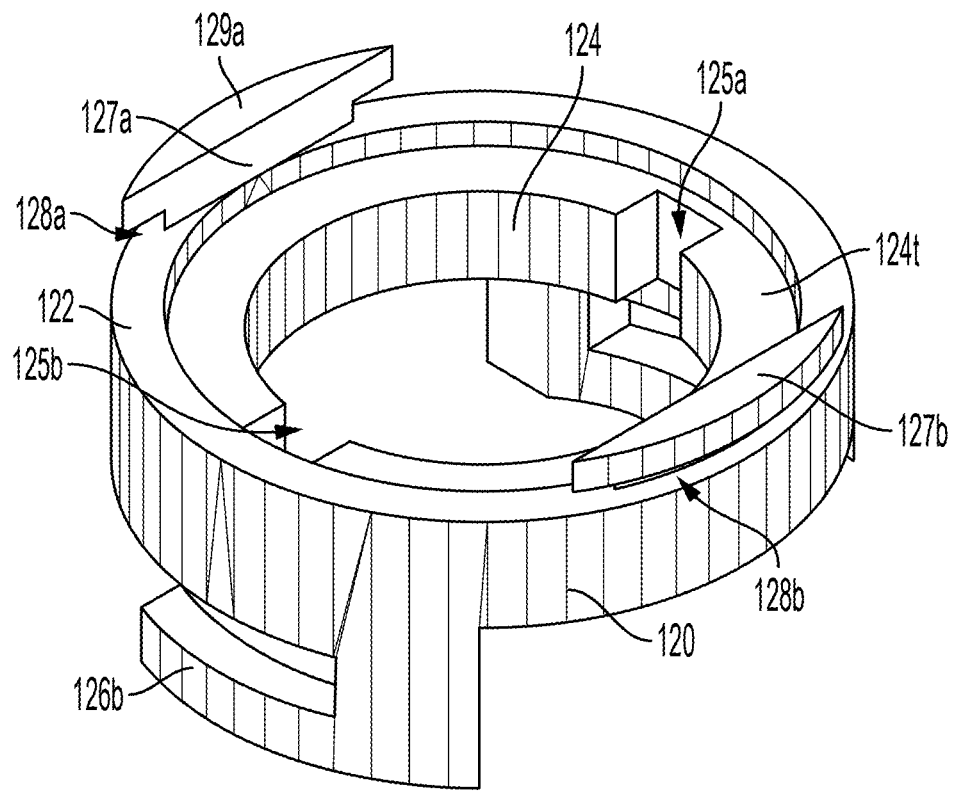
FIG. 6 shows a top perspective view of an upper portion of the mobile scope of Fig. 1.
Figure 7:
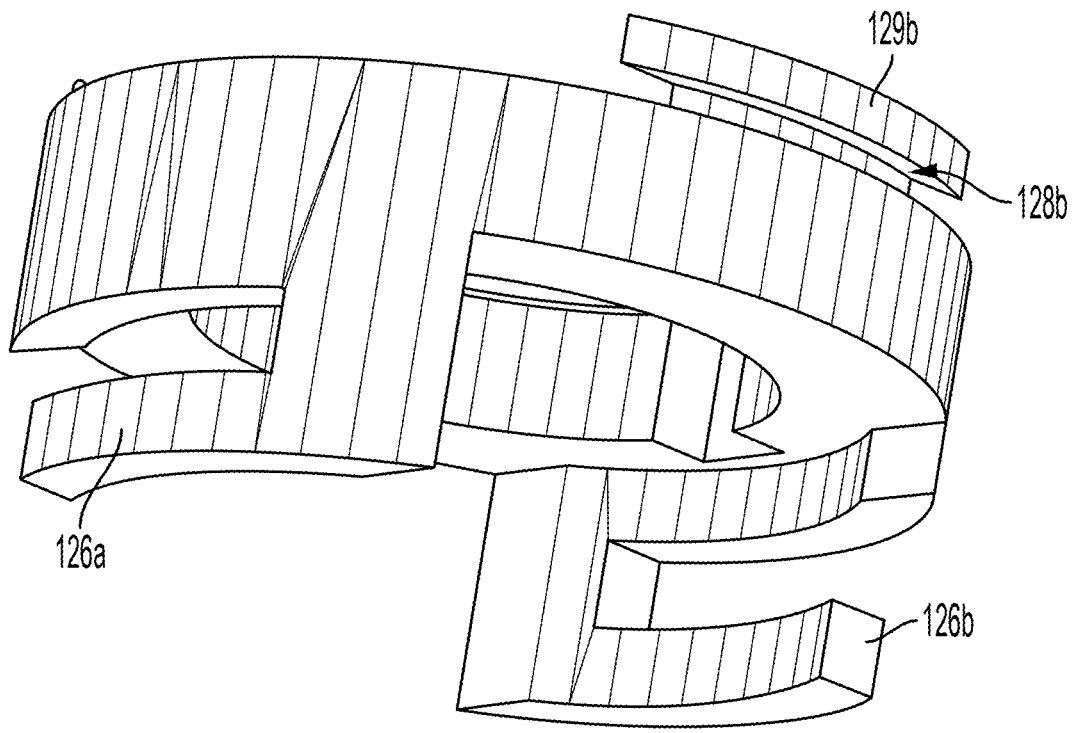
FIG. 7 shows a bottom perspective view of the upper portion of the mobile scope of Fig. 1.
Figure 9:
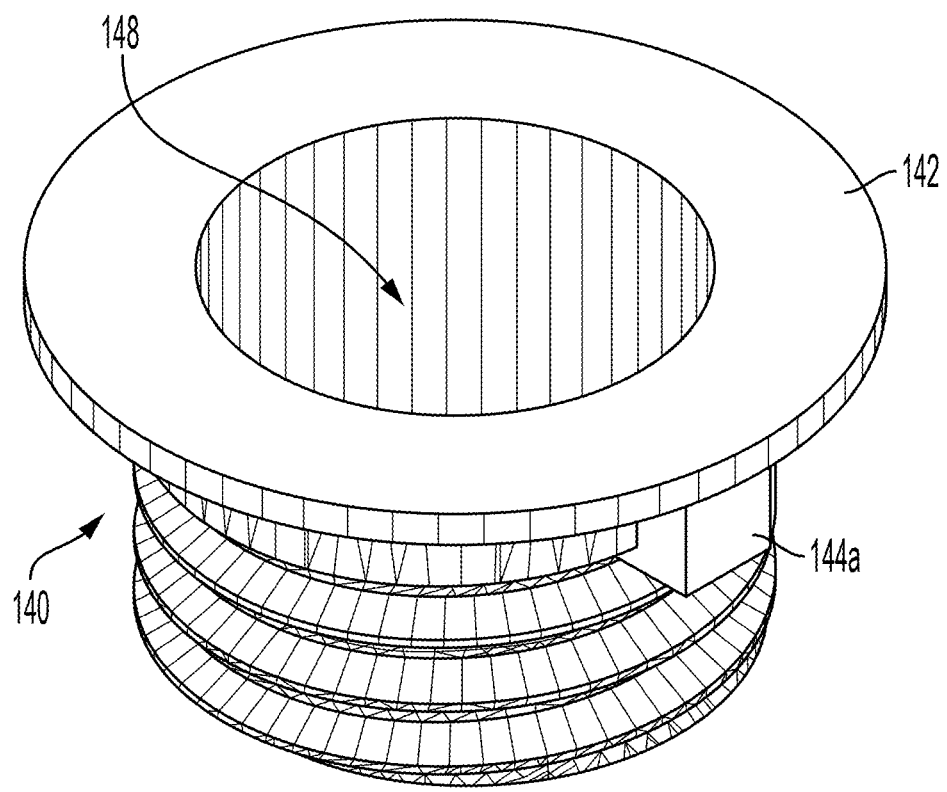
FIG. 9 shows a perspective view of a slide platform of the mobile scope of Fig. 1.
Figure 10:
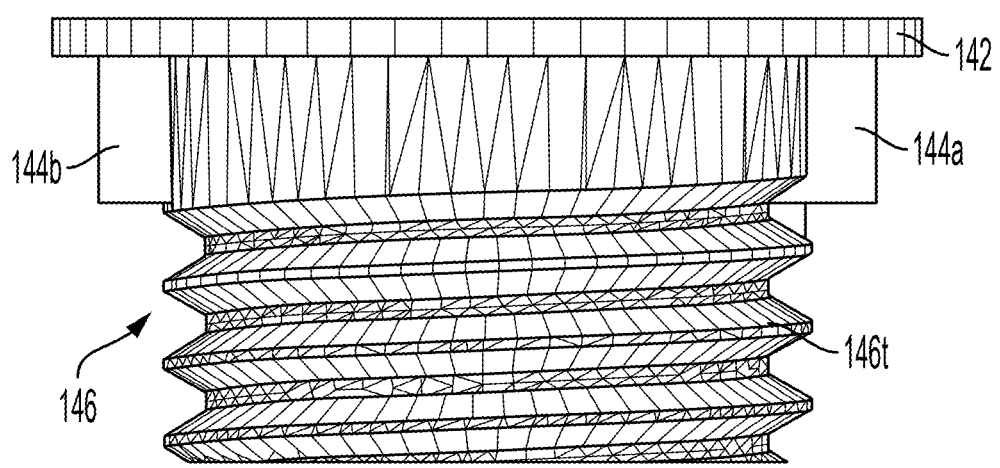
Fig. 10 shows a side elevation view of the slide platform.
Figure 11:
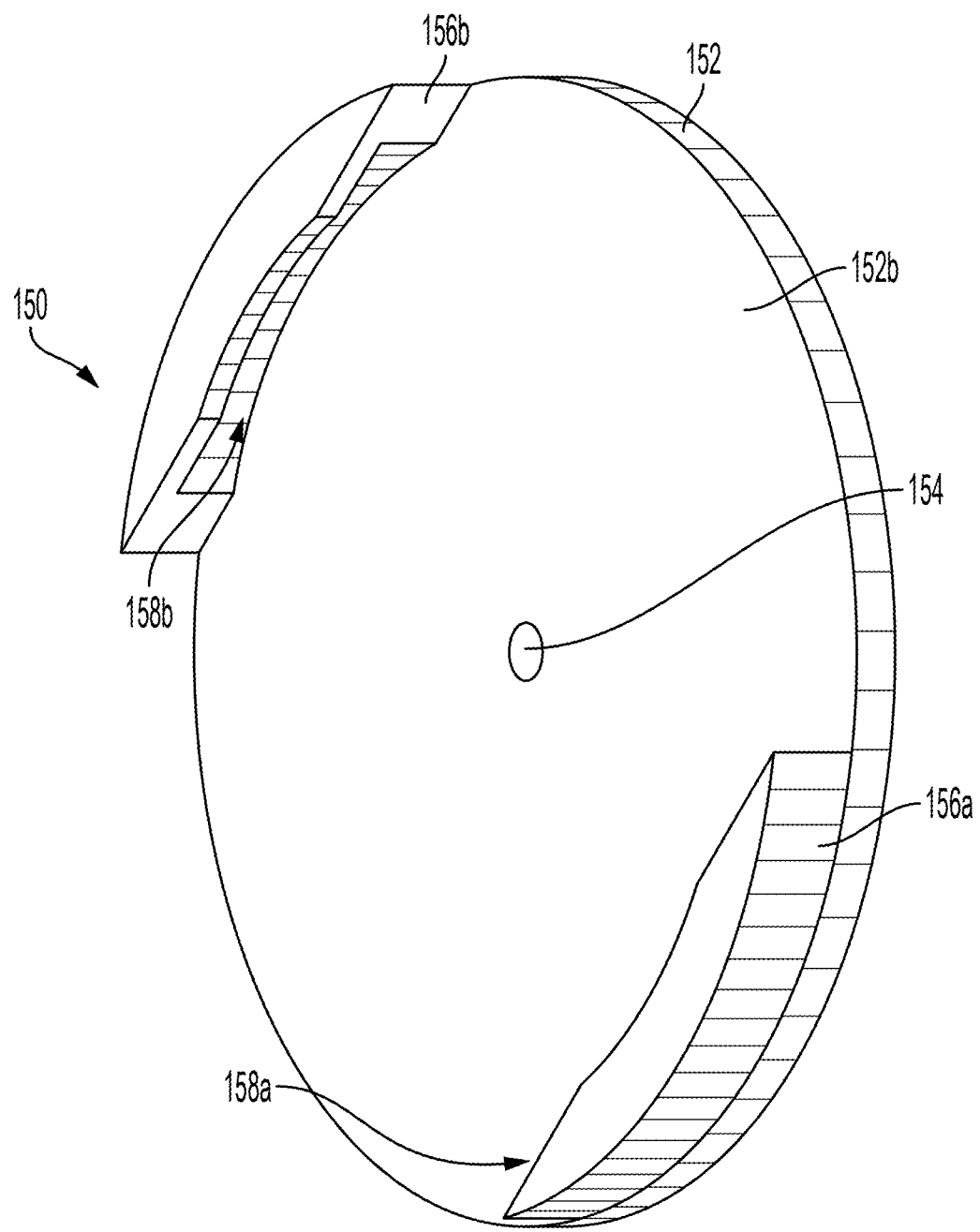
FIG. 11 is a bottom perspective view of the lens of the mobile scope of Fig. 1.
Figure 12:
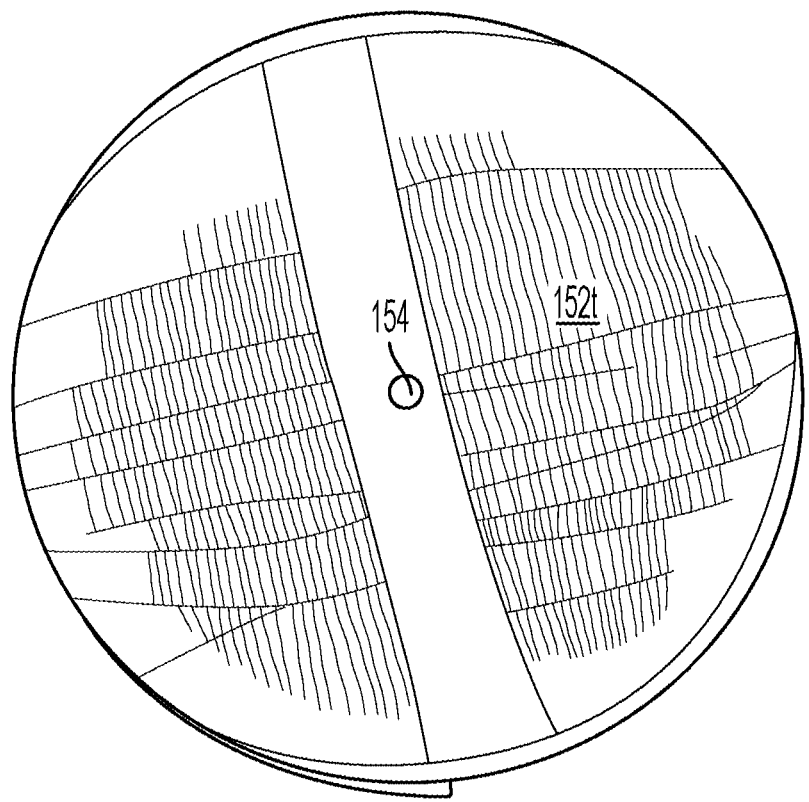
FIG. 12 is a top view of the lens of FIG. 11 with a glass bead.

In more detail, the lower section 110 can have a bottom plate portion 112 that may be generally cylindrical in shape. The bottom plate portion can include a rectangular recess 114 on the bottom most face for receiving an LED module, or light source 160. The light source 160 can be in communication with a central through hole 111 ofthe scope 100 to allow for the light to illuminate a sample or sample slide. In the illustrated embodiment, as shown in FIG. 5, an LED 162 is shown extending above a top surface 112t of the bottom plate portion. Alternatively, the light source 160 can be placed on the bottom most face, without the recess 114, or the recess itself can be any other shape to accommodate the shape of the light source. In some embodiments, the light source 160 can include a button or slide switch, 164 to manually turn the light source on or off The light source 160 can provide lighting to illuminate the sample 102 and can be generated through LEDs within the scope, the lights of the imaging and processing equipment, an external light source like a flashlight or lightbulb, or natural lighting like the sun. The light source 160 can be modified, and different lighting scenarios can be swapped in the scope to allow for various views and types of microscopy. Furthermore, various filters can be applied before the light hits the sample to filter out light of certain wavelengths, allowing for the use of fluorescence microscopy. Various mirrors, including dichroic mirrors, can be placed within the microscope to modify the light path. Certain samples can fluoresce when excited by specific wavelengths of light. By placing a filter before the light from the light source hits the sample, only one or a few specific wavelengths of light will hit the sample. The light source can hit the sample at 90 degrees from the viewing angle of the lens or from the direction of the viewing angle. This can be accomplished through the placement of the light source or through the use of mirrors in directing the light through the magnification scope. Additionally, outside light interference can be eliminated through the use of a light-tight material and encasing for the production of the magnification scope. Combining this together allows for the use of fluorescence microscopy for sample identification and analysis. Cyanobacterial for example, is excited and fluoresces when it is hit with 620 nm wavelength light. Observations of fluorescence of a sample will assist in the identification of the sample as specific sample types have specific wavelengths of light that causes it to excite and fluoresce and specific samples have specific wavelengths of light that it fluoresces out.

Figure 3:
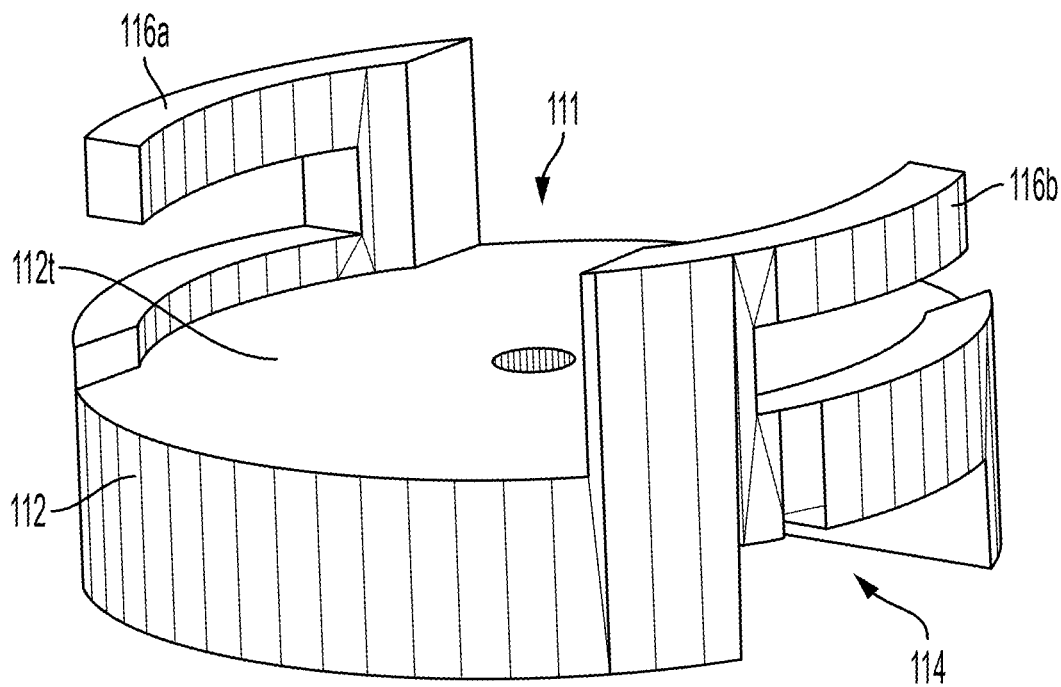
FIG. 3 shows a top perspective view of a lower portion of the mobile scope of Fig. 1.
Figure 4:
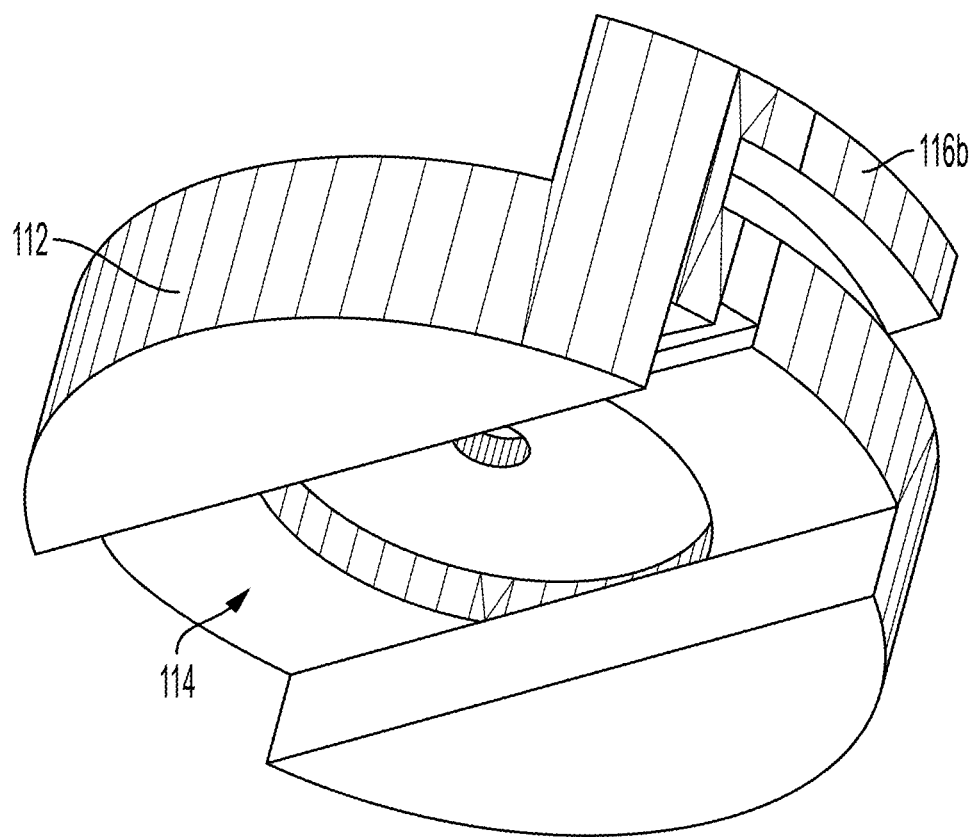
FIG. 4 shows a bottom perspective view of the lower portion of the mobile scope of Fig. 1.
Figure 13:
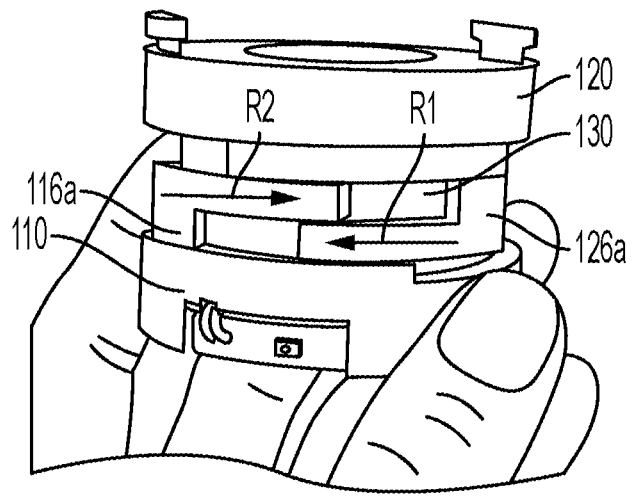
FIG. 13 is a side view showing one assembly step for assembling the mobile scope of Fig. 1.

Extending upward from the top-most face 112t of the bottom plate can be two lower locking portions 116a, 116b to lock the lower section 110 to the upper section 120, as seen in FIGS. 3 and 4. The two lower locking portions 116a, 116b can be generally "C" shaped extensions. When viewed from the top, the lower "C" shaped extensions 116a, 116b can follow the curvature of the bottom plate portion 112 to define an interior lumen 111. The lower "C" shaped extensions 116a, 116b can mate with corresponding upper "C" shaped extensions 126a, 126b. The "C" shape of the upper locking portions 126a, 126b can be a mirror of the lower locking portions 116a, 116b, and the upper locking portions 126a, 126b can extend downward from a bottom face 124 of the upper section. The height adjuster 130 can be disposed in the lumen 111 of the lower portion 110 of the scope 100 before the upper portion 120 is lowered down onto the lower portion 120. The upper and lower portions 110, 112 can be locked together, as shown in FIG. 13 by rotating the upper "C" shaped extensions 126a,b in a direction RI and rotating the lower "C" shaped extensions 116a,b in an opposite direction R2, thereby capturing the respective upper "C" shaped extensions 126a,b in the respective lower "C" shaped extension 116a,b with an interference fit. As shown in FIG. 13, the height adjuster 130 is thereby captured between the upper and lower portions 110, 120. Between the upper and lower "C" shaped extension, two windows 104a, 104b are formed. These windows 104a, 104b permit access to the height adjuster 130 when the scope is fully assembled. The height adjuster 130 can be a generally cylindrically shaped portion having an interior thread 132 extending along the entire height of the height adjuster. The height adjuster can have an outer diameter that is approximately the same as, or slightly smaller than, the lumen 111 defined by the upper and lower "C" shaped extensions 116a,b, 126a,b. In some embodiments, the outer face 134 ofthe height adjuster 130 can be knurled, ribbed, or otherwise textured to provide tactile feedback to a user.

Turning back to the upper portion 120, the upper portion can be generally cylindrical, similar to the lower portion, having the same outer diameter as the lower portion 110. Extending radially inward from the upper portion, can be an inner collar 124 having two vertically oriented notches 125a, 125b, circumferentially offset approximately 180 degrees from one another. The notches 125a, 125b can be used to rotationally constrain the slide platform 140 to allow for vertical translation of the slide platform 140 within the lumen 111. A top-most face 124t of the inner collar 124 can define a lower stop to prevent a top-most face of the slide platform 142 from falling below a top slide support surface 122 of the upper portion 120. Thus, when the slide platform 140 is at a lower most position, the top-most face 142 of the slide platform 140 can be coplanar with top slide support surface 122 of the upper portion 120.

The slide platform 140 is the feature that supports the slide, or sample, 102 during operation of the scope 100 and can be moved up and down, or in the Z-direction, along the central axis of the scope 100. Alternatively, or additionally, the side 102 can be any container or tool to contain a sample, including but not limited to a slide, a microscope slide, a capillary tube, a flat capillary tube, and equivalents thereof. The slide platform 140, as illustrated, includes a central lumen 148 extending therethrough to permit light from the light source to reach a slide disposed on a top-most face 142 of the slide platform 140. The slide platform can have a threaded screw portion 146 extending downward from the top slide support 142. The threaded screw 146 can have an exterior diameter that is less than the outer diameter of the top slide support. The threaded screw 146 can have an external thread 146t that matches the internal threading 132 of the height adjuster 130, such that the slide platform 140 and the height adjuster 130 can be threaded together. Extending radially outward from the screw portion 146 can be two tabs 144a, 144b that are sized and oriented to be received in respective notches 125a, 125b of the upper portion. When the respective tabs 144a,b are received in the respective notches 125a,b, the slide platform 140 is rotationally constrained relative to the upper portion 120, while allowing the side platform 140 to slide vertically, or in the Z-direction, within the lumen 111, relative to at least the upper portion 120.

Returning to the upper portion 120, there can be two, or more, features 127a, 127b to restrain or hold a slide or sample 102 extending upward from the top-most face 122 of the upper portion 120. The retention features 127a, 127b can each have a rounded outer surface which extends about the outer radius of the upper portion and a flat inward face. The retention feature can additionally include respective grooves 128a, 128b about the outer face to define a respective outer retention lip 129a, 129b. The respective retention lips 129a,b can be used to retain a lens 150, or a lens tube 300. It should be noted that the slide 102 holding the sample is generally smaller than the opening formed between the retention features 127a,b allowing the slide to move both laterally and longitudinally over the lumen 148 of the slide platform 140 and under the lens 150. This loose sliding arrangement permits the slide to be manually positioned for the best possible view of the contaminant areas on the slide 102. This loose sliding arrangement combined with the manual positing of the camera 200 itself on the scope lens 150 provides critical flexibility in positioning, focus and usability of the overall system 100.

The lens 150 can include a generally cylindrical plate 152 having a hole disposed therethrough for retaining the glass bead lens, or glass bead holder, 154. In use, a mobile digital data device can be placed, without any retaining features, on a top surface 152t of the plate 152, where the image capture module (not shown) of the mobile digital data device, can be aligned with the glass bead lens 154 to allow the image capture module to capture an image of the sample 102 after the sample 102 is adjusted to the correct focus with the height adjuster 130. Extending downward from the lower face 152b of the plate 152 can be two retention arms 156a, 156b. Each of the two retention arms 156a,b can have a respective interior groove 158a, 158b which is sized to receive the retention lip 129a,b of the upper portion 120. As seen in at least FIG. 14, the lens 150 can be rotated in a direction R4, while the upper portion is rotated in an opposite direction R3 to lock the respective retention lip 129a,b in the respective groove 158a,b of the lens. The lens 150 used in the illustrated magnification lens component is a spherical glass ball/bead. Glass balls/beads of various sizes achieve various degrees of magnification. Lens holders containing various bead sizes can be swapped in and out of the lens component to generate different magnifications. However, the magnification lens component is a structure that can contain one or multiple lenses of various shapes, structures, and degrees of convexity, which can be placed at various locations and series to magnify the image of the sample. The component containing the magnification lens is adjustable and modifiable so various lenses can be swapped to generate various degrees of magnification and various resolutions. In an alternative embodiment, other lenses can be used.

Figure 14:
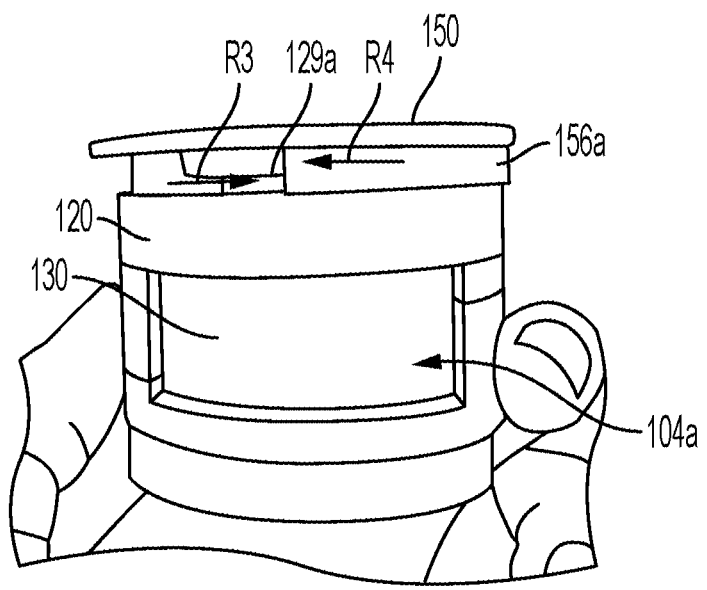
FIG. 14 is a side view showing another assembly step for assembling the mobile scope of Fig. 1.
Figure 15A:
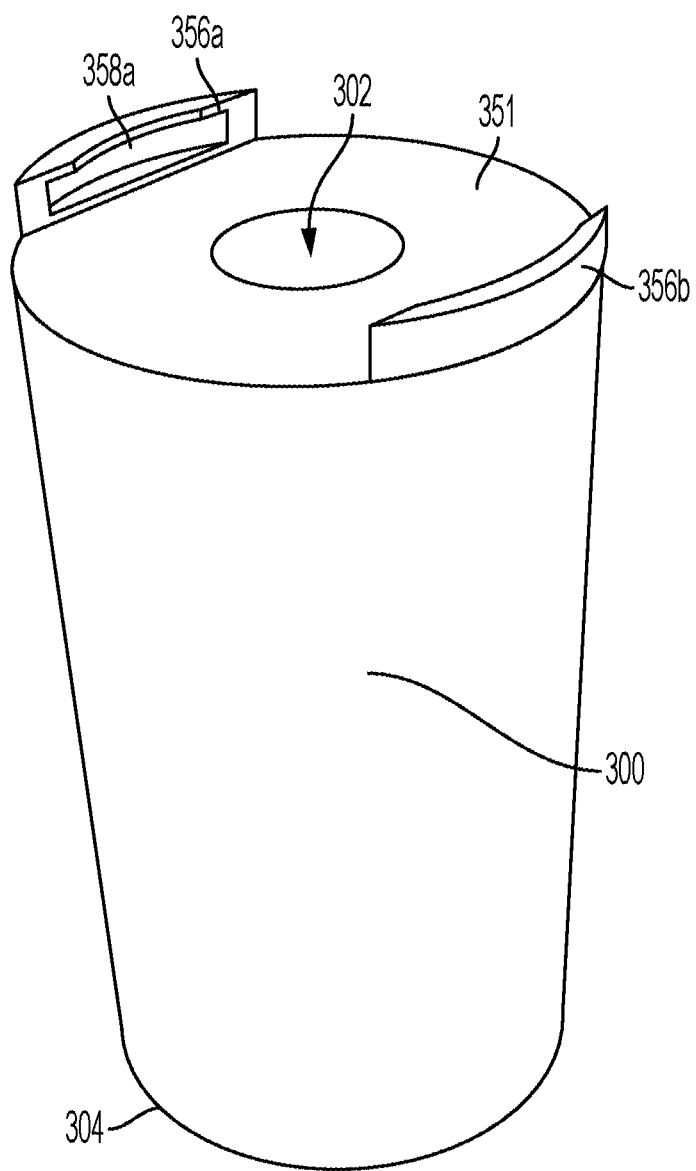
FIG. 15A is a perspective view of an alternative lens.
Figure 15C:
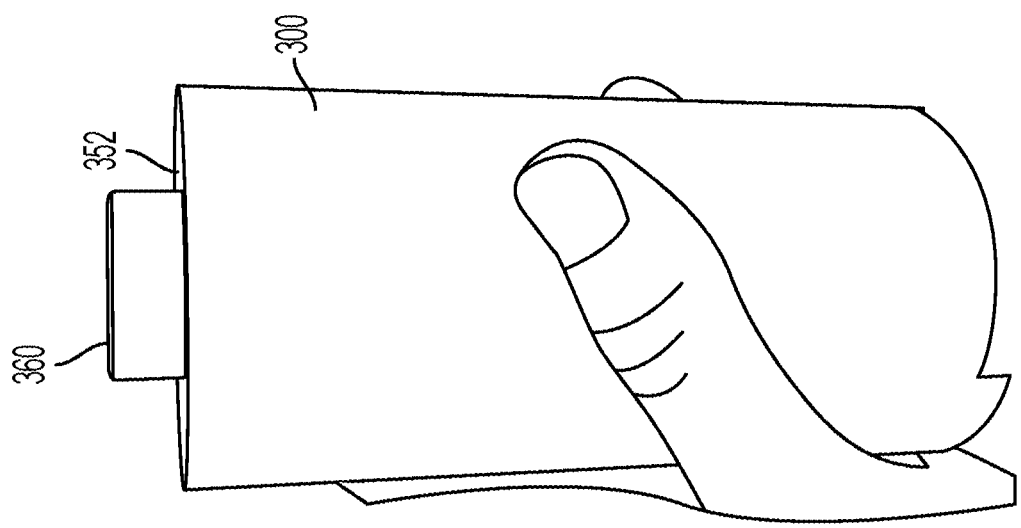
FIG. 15C is a partial side view of the alternative lens of Fig. 15A with an image capture module.
Figure 15B:
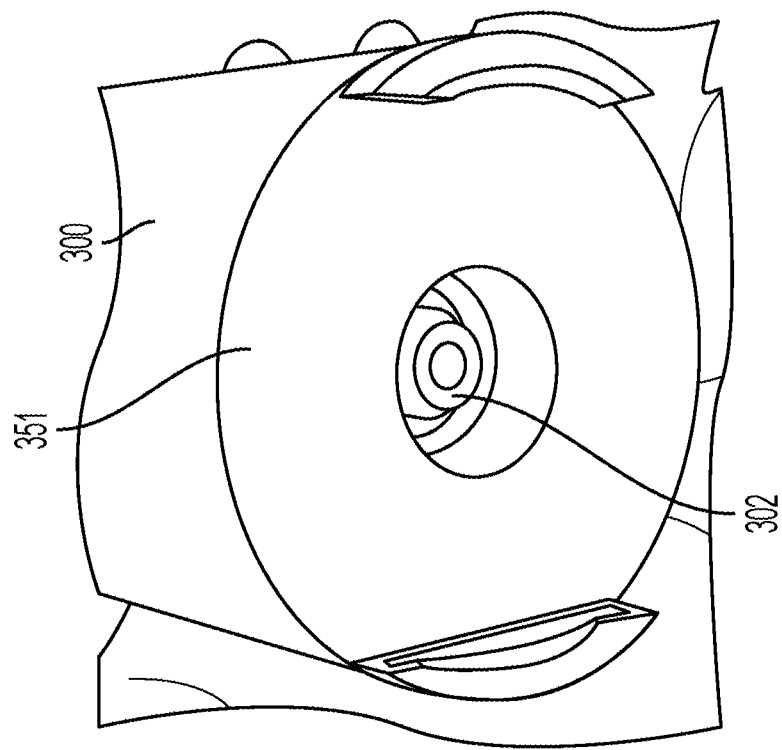
FIG. 15B is a partial perspective view of the alternative lens of Fig. 15A and optics.
Figure 16A:
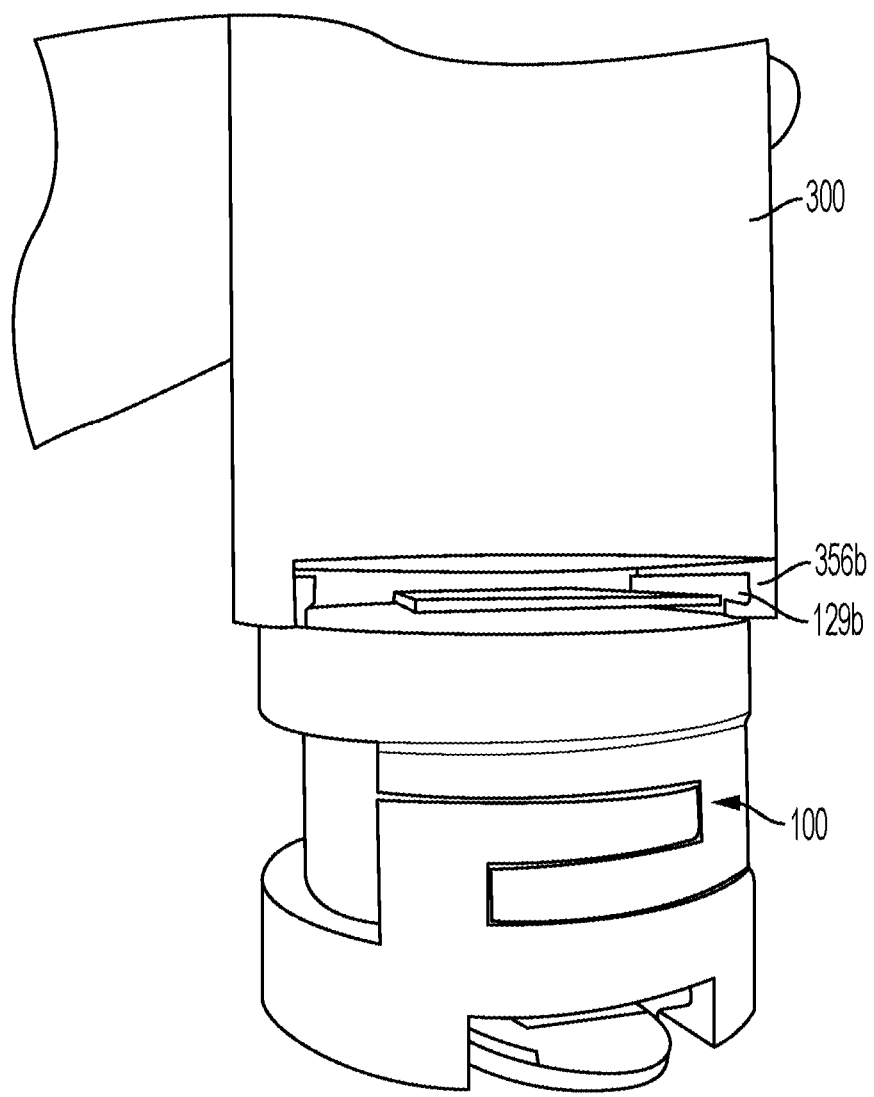
FIGS. 16A & 16B show the alternative lens of Fig. 15A in combination with the mobile scope of Fig. 1 in an off and illuminated configuration.
Figure 16B:
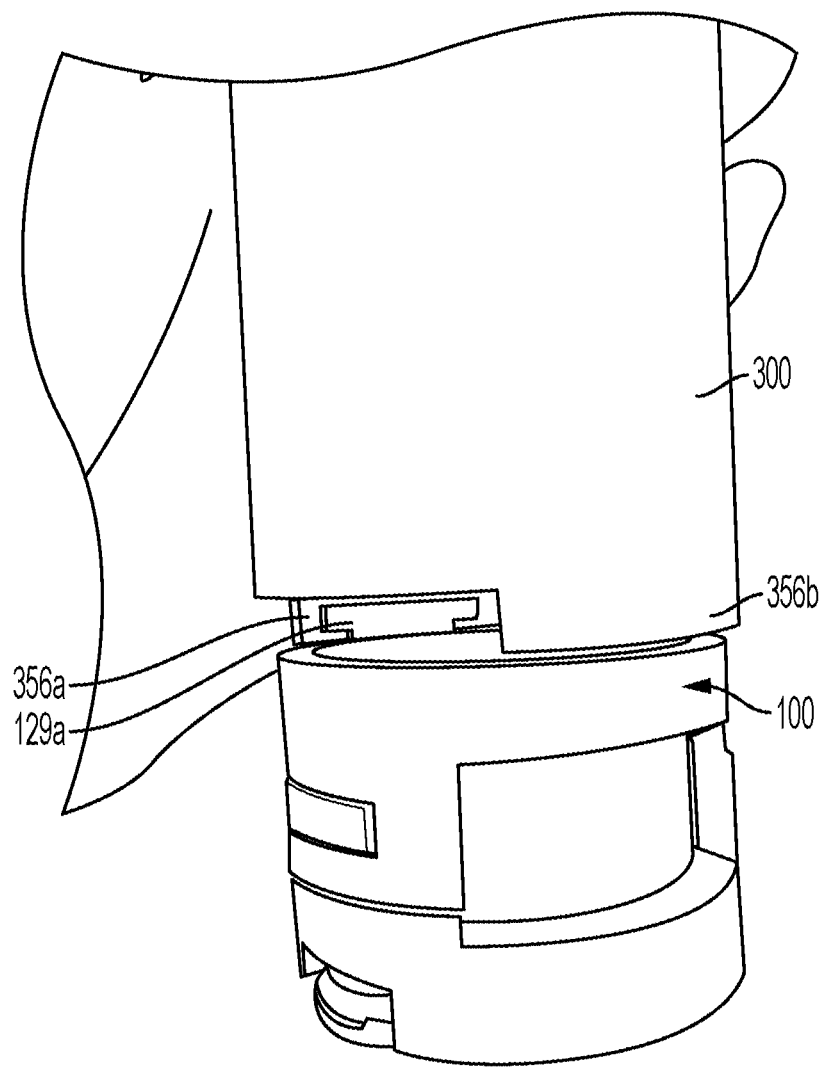

As shown in FIGS. 15A, 15B, ISC, 16A, and 16B, different scopes and lenses can also be swapped out and attached to the portable microscope, or scope 100. To remove the scope 100 from the lens 150, the scope can be rotated, in directions opposite to R3, R4, as shown in FIG. 14, to allow the retention lips 129a,b of the upper portion 120 to be removed from the groove 158a,b of the lens 150. This allows the user to quickly and easily change various the scopes to be used for the portable microscope. In the illustrated embodiments, an elongated scope attachment 300 with an objective lens 302 and eyepiece lens 304, similar to that of a compound microscope, are shown. The alternative lens can have similar retention features 356a, 356b extending downward from a lower most surface 351 having respective grooves 358a, 358b to retain the retention lips 129a,b of the upper portion 120. In use, as shown in Fig. ISC, for example, in place of a cameral module of a mobile digital data device 200 being used to capture an image of a sample, a dedicated image capture module 360 can be placed on the top surface 352 of the elongate scope attachment 300. The image capture module 360 can be connected, wired or wirelessly, to a computer, controller, or a mobile digital data device, for further processing of the image, as is discussed below.

Figure 18A:
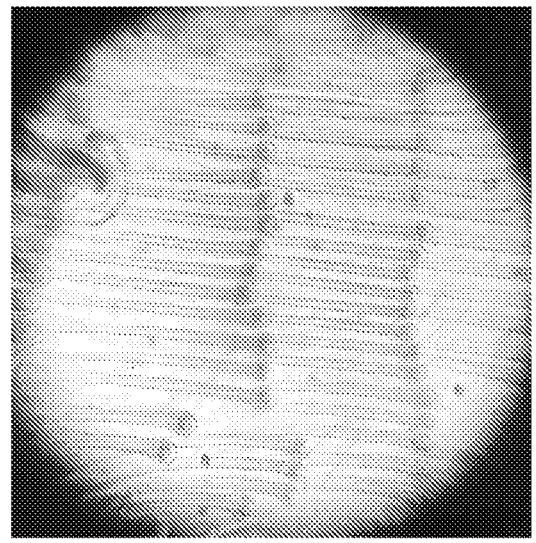
FIGS. 18A & 18B show samples magnified using different lenses.
Figure 18B:
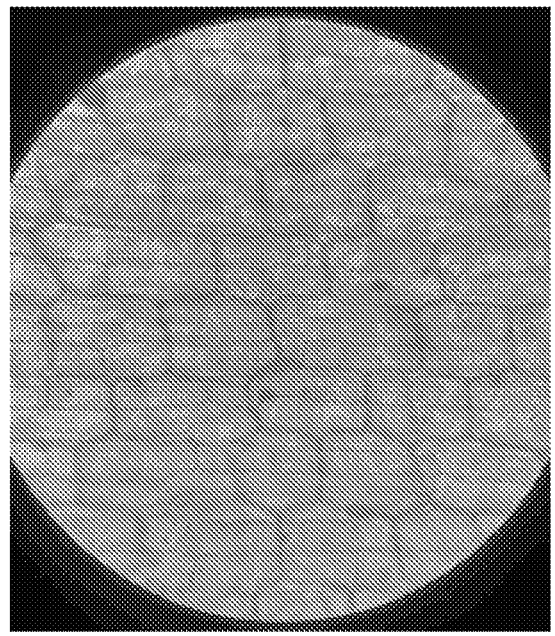

Alternatively, various combinations of objective and eyepiece lenses can be used to change magnifications including but not limited to 40×, 100×, 200×, 400×, 800×, 1000×, etc. Given the easy attachment and removal of scopes onto the body of the phone microscope, scopes and lenses of different types, combinations, and configurations can be used and attached to the portable microscope. Alternatively, or additionally, the scope can be equipped with a variety of attachment lenses to provide enhanced functionality for professional users, or in situations where a variety of magnifications would be required. For example, some impurities may require lower magnification to properly be identified in a liquid sample, whereas microorganisms would require a higher magnification, as seen in FIG. 18A showing a sample magnified to 120× and in FIG. 18B showing a sample magnified by 400× using the instant scope 100, with two different lens types.

Figure 17A:
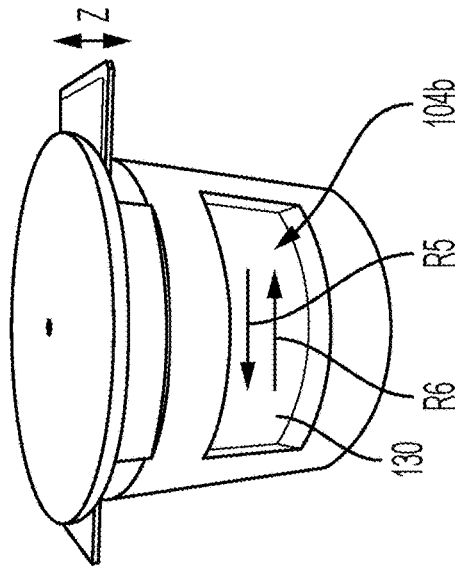
FIG. 17A shows a first step of using the mobile scope of Fig. 1.
Figure 17C:
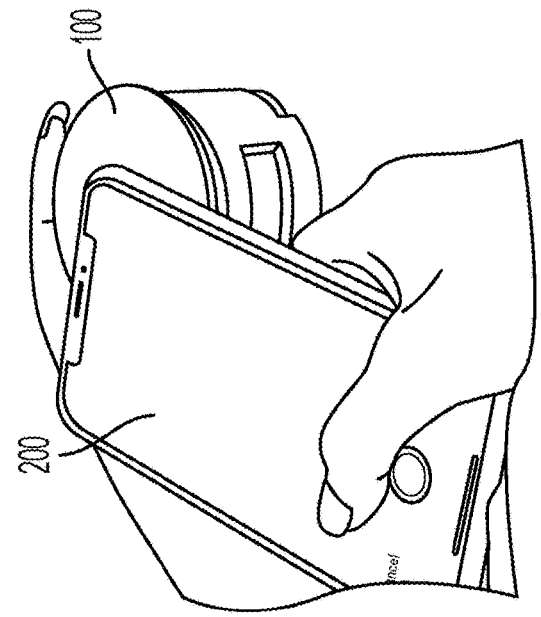
FIG. 17C shows a third step of using the mobile scope of Fig. 1.
Figure 17B:
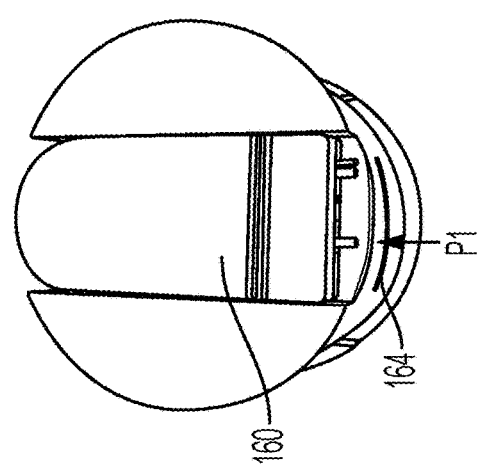
FIG. 17B shows a second step of using the mobile scope of Fig. 1.
Figure 17D:
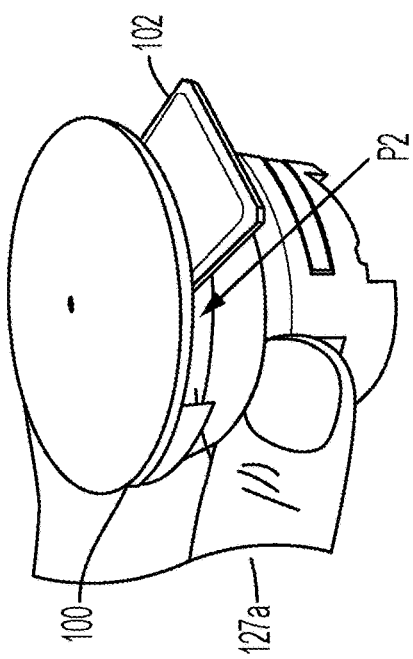
FIG. 17D shows a fourth step of using the mobile scope of Fig. 1.

In one exemplary method of use, the LED light source 160 of the scope can be turned by pushing a switch 164, in a direction P1, to illuminate the scope 100, as seen in FIG. 17A. A sample 102 can be inserted in the scope 100 in a direction P2, between the two slide retention features 127a,b of the upper portion 120, as shown in FIG. 17B. The slide through hole can be generally perpendicular to a central axis of the scope. The sample can be disposed on a slide 102, for example. The platform height adjuster 130 can be rotated in directions RS, R6, to adjust the height, in the Z direction, of the slide platform 140 and thereby adjusting the focus of the sample 102 to obtain a clear view, as shown in FIG. 17C. The mobile digital data device, phone, or other camera device 200 can be placed on the top of the scope 100 to take an image of the sample and store the image in a memory module of the mobile digital data device, as seen in FIG. 17D. Advantageously, there are no special use retention features on the scope 100 to secure the mobile digital data device 200, so any model device or image capture device can be used. Alternatively, the sample can be viewed through the scope with the naked eye. If a phone or other computational device is used, a processor or controller can run the image recognition algorithm I000, 2000 which can be used to analyze the sample image taken and get instant results of what the sample contains.

While in certain embodiments, the scope I00 can be used with the naked human eye to view samples, it is contemplated that not all users will be properly trained to identify the samples due to a lack of formal education, or in some cases, may not be able to properly visualize the samples. Thus, the instant disclosure contemplates the use of an image processing and recognition algorithm I000, 2000 that can be used to visualize the samples for analysis. The mobile digital device used in connection with the portable microscope can, in addition, perform highly technical image recognition algorithms to automatically identify the foreign matter found in the samples. In general, the algorithm can use convolutional neural networks trained to recognize target samples in order to analyze and classify the types of samples visualized and captured under the scope using the image capture and processing device. The program can take the form of an application that is downloaded and installed on the device, such as a mobile data processing device, e.g. a mobile smartphone or tablet. In other embodiments, the program or application can be a web application or website that can be run on an external server and accessed by a device when the mobile digital data device is in connection with a wired, or wireless, network or the Internet. The algorithm may, additionally or alternatively, have other applications, such as analysis of color, structure, wavelength, concentration, cell count and more. The results from the algorithm can be returned and displayed for the user all on the same mobile digital device. In this, locally run embodiment, the mobile digital data device may not require an active wireless network connection to function, and the algorithm can run completely natively on the device. Additionally, or alternatively, the results can also be sent, via a wireless or wired network, to a database that stores the data and plots it on a live map, in which the user can access to determine the results from different areas around the world. Additionally, or alternatively, the data can be plotted on a graph for analysis. The image data can additionally, or alternatively, be displayed with markups and comments on the sample identification, such as the classification of the sample, the concentration of the sample, or the count of the sample. The data can also be processed to predict disease, pollution, and movement of microscopic material across regions.

In one exemplary embodiment, the image analysis can be performed with the following algorithm, which provides a technical advantage over existing technologies. Namely, the instant algorithm is capable of locally being run on mobile digital data devices which are not specially designed desktop computers having so called "pro" hardware. Such, "pro" hardware are not portable for use in the field, have a high cost, and often require specialized hardware components. This algorithm can, essentially, democratize the sample analysis to allow a larger pool of non-professional, and professional, users to make use out of the instant portable magnification scope and remote image recognition using existing mobile digital data device technology such as a smart phone or a tablet. Alternatively, the mobile digital data devices are capable of capturing an image of a sample using the instant scope, or any other magnification scope, and sending the images to a remote server for processing with the algorithm on the remote server. This functionality is due to the fact that mobile digital data devices, generally, are equipped with data receivers and transmitters, or modems, which allow for wireless (or wired) connections to a larger data network. In use, a user will collect a sample and place the sample on a slide 102. The slide 102 can then be inserted into the scope 100 for magnification and a camera module, e.g. of a mobile digital data device, can obtain an image of the sample (after focusing the sample), and the image can be stored in a memory module of the mobile digital data device, a remote server, or a data storage device.

In an exemplary method 1000, shown in FIG. 19 an image can be captured with a mobile digital data device, using the instant portable microscope, or another microscope system, at step 1002. After an image is acquired from the portable microscope, in step 1002, using a camera module on the mobile digital data device, the mobile digital data device can run the captured image through the algorithm for sample identification. The mobile digital data device can optionally process the image in step 1002. The image can then be run through an image recognition algorithm, in step 1004, for identification of the sample coupled with the instant scope. The algorithm can then return and store the identification result in step 1006 and allow for an instant and portable analysis of the image, replacing a need for manual identification by trained scientists and microbiologists, as well as a lag time before image capture and sample identification. Thus, this removes traditional bottlenecks that result from a lack of scientific expertise for sample identification, allowing for scaling of the ability for sample identification to situations, industries, and areas where lack of scientific expertise is an issue. Optionally, in step 1010, the image and results can be uploaded to a server or cloud database. While reference is explicitly made to a mobile digital data device, the instant algorithm can be run on any suitable computer CPU.

In an alternative method 2000, as shown in FIG. 20, an image can be captured similar to the method 1000 above, in step 2002. Instead of locally storing the image, the image can be uploaded and stored on a remote server, in step 2004, and the image can be processed on the remote server in step 2006. The image can then be processed through CNN to identify the sample, in step 2008, this processing can additionally be completed on the remote server, where the remote server additionally returns results and stores those identification results on the remote server, at step 2010. Finally, the results can be transmitted to the user on the mobile digital data device in step 2012.

As noted above, with respect to the method 1000, an image can be captured of the sample 102 under the scope 100 using mobile digital data device 200, which includes a camera module. The image can be locally stored on the mobile digital data device in a local memory module, and an image processing software can then retrieve the image for processing. This processing includes, but is not limited, to resizing the image to fit the input image size needed for a Convolutional Neural Network (CNN). Additional preprocessing steps can include: 1) cropping the image to the region containing the sample to be identified, 2) reducing background noise, or 3) creating a copy of the image with a hemocytometer grid overlay for cell count, etc. After the image is processed, the image can be then fed into a trained CNN model. Additionally, the CNN can be continually trained as more live data, e.g. the images of samples, is collected by users and inputted into the CNN. The CNN will then output insights on the sample; in this case, identification of the type of sample (ex. genus of bacteria). The results are displayed for the user and can be stored on the image capture and processing device. Additionally, the results and the image data can also be uploaded to a server or cloud database. The advantage of this process is that all processing of the image data and identification of the sample image can be done locally on the image capture and processing device. Thus the device does not need to be connected to a network for image identification as long as the CNN model and algorithms are downloaded and installed in the device. Other alternative steps can be taken for sample image identification as well and some steps can be interchanged in order.

After an image is captured of the sample under the scope 100 using the mobile digital data device, as discussed with respect to method 2000, it can be uploaded to a server or cloud database. After the image is uploaded onto the server, it can be processed. Image processing includes but is not limited to those described like those above in method 1000 (e.g. resizing image, cropping image, reducing background noise, hemocytometer grid overlay). The processed image is then fed into a trained CNN model. The CNN then output insights on the sample and the results are then sent back to the user in a format easily accessible. This can be a result that shows up directly on their image capture and processing device, or on another platform, application, or website. Steps within this process can be interchanged. For example, step 2004 and step 2006 in the block diagram in FIG. 20 can be interchanged.

Additional steps can also be added to the algorithm. For example, additional steps can include algorithms that filter out certain colors within the image, algorithms that look for shapes and borders within the image, and algorithms that count the area and number of certain shapes within the image. The addition of these algorithms can permit for not only the identification of sample type but also the quantification of sample amount inside an image. Additional applications of these algorithms include processing of the image before feeding it into the CNN to allow for increased identification and quantification accuracy.

A specific aspect of the algorithm that allows for quantification is the addition of virtual hemocytometer grids that overlay the captured magnified sample image. For example, if a user chooses a magnification of 400× using the phone scope or uses a sample image at 400× magnification, the user can, using an on screen graphical user interface, identify that the image magnification is at 400×, or the image can be automatically pre-noted with the magnification size. The program can then create a copy of the sample image with an overlay of virtual gridlines at 400×. Those gridlines can act as hemocytometer grids. This image with a hemocytometer grid overlay can be used in the algorithm to calculate sample/cell count and sample area by counting how many cells are in a grid region and the amount of area a sample covers in an area of the grid. The algorithm can make use of the known magnification of the captured image of the sample to calculate the quantity of the sample using an edge finder algorithm to determine the sample, cell count, or area of the image that the sample takes up.

Figure 21:
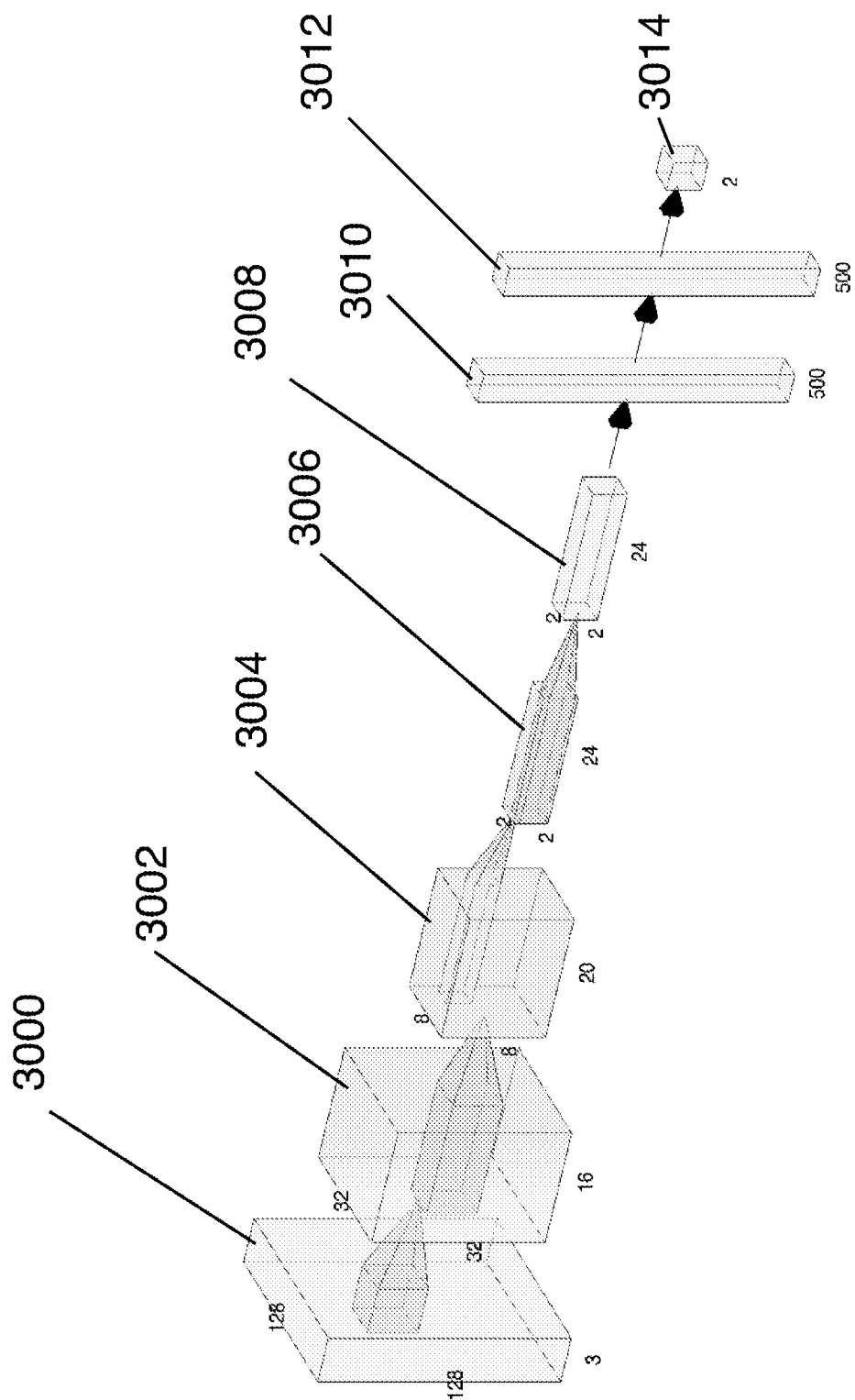
FIG. 21 shows an embodiment of an architecture of a convoluted neural network for sample identification.

A Convolutional Neural Network (CNN) is used in the algorithm for sample identification from the captured image under the phone scope because CNNs are well suited for image classification. In the instant case, a CNN with the following architecture was designed for sample identification, as shown in FIG. 21. Alternatively, the CNN is not necessarily limited to the illustrated architecture of FIG. 21.

In general, a CNN as used herein can be defined as a network that employs a mathematical operation called convolution, where convolutional networks are a specialized type of neural networks that use convolution in place of a general matrix multiplication in at least one of their layers. In deep learning, a CNN is a class of deep neural networks, commonly used in analyzing visual imagery, or image samples. In general, CNNs are regularized versions of multilayer perceptrons, which usually mean fully connected networks, that is, each neuron in one layer is connected to all neurons in the next layer. CNNs can take advantage of hierarchical patterns in data and assemble more complex patterns using smaller and simpler patterns. In CNNs, a connectivity pattern between neurons resembles the organization of an animal visual cortex, where individual cortical neurons respond to stimuli only in a restricted region of the visual field known as the receptive field. The receptive fields of different neurons can partially overlap such that they cover the entire visual field. Advantageously, CNNs rely on relatively little pre-processing compared to other image classification algorithms, so the network can learn the filters whereas in traditional algorithms those filters were hand-engineered.

The instant CNN can be implemented with four convolution layers, where each layer can be followed by batch normalization and a Leaky ReLU activation function. A batch normalization function can standardize the inputs to a layer for a mini-batch to stabilize the learning process and reduce the number of training epochs required to train the CNN. A Leaky ReLU, or Leaky rectified linear activation unit, activation functions that again aids the CNN learn complex patterns in the input data, with less heavy computation and therefore takes less time to train and run. Moreover, a Leaky ReLU avoids the issues with a ReLU activation function by providing a small value which is 0.01 times x if a negative value is returned. The Leaky ReLU activation function, thus, can be used to avoid deactivating neurons in the CNN which can occur with higher learning rates.

The first three layers can additionally be followed by a Max Pool operation. A Max Pool operation can be a pooling function, such as the average of the rectangular neighborhood, L2 norm of the rectangular neighborhood, and a weighted average based on the distance from the central pixel. Where max pooling reports the maximum output from the neighborhood. After the convolutional layers in the neural network, two fully connected dense layers can be used.

Finally, a softmax function can be used to construct a probability distribution over the output classes (2 classes in FIG. 1). A softmax function can be generally used to normalize the output of the network to a probability distribution over a predicted output class. The number of output classes depends on the different number of possible output classifications needed for the model. In the instant model, the instant system also implemented a dropout rate of 0.3 to reduce overfitting. The reason for the relatively clean CNN, with 4 convolution layers and 2 connected layers is that it advantageously allows for fast training over large datasets. This is important as the model will be retrained as new data are collected using electronic devices with the portable microscope. The CNN will, effectively, output a classification of the input image of the sample. The classification can identify foreign bodies in the liquid or solid sample. For example, the CNN can be trained to identify certain cyanobacteria, harmful algal blooms, microplastics, mold, $E.$ $coli,$ $salmonella,$ $legionella$ bacteria, filamentous bacteria, and other microbiological bodies make up of a sample. The CNN can be specially trained for identification of particular microbial foreign bodies, depending on the use case.

FIG. 21 illustrates one exemplary embodiment of the architecture of the CNN that can be used for sample identification. At each stage of the algorithm shown in FIG. 21, tensor dimensions are displayed. The first tensor 3000 is of image data fed in as normalized RGB (red, green, blue) values, in 3 dimensions, as 128×128 pixels. The image data is then passed through four convolutional layers and two fully connected feed forward layers. The image tensor is then mapped onto a 32×32×16 tensor 3002, in a 2D convolution layer, layer with a 10×10 kernel (blue). The image is then mapped onto an 8×8×20 tensor 3004 with a 10×10 kernel using a max pool operation. The image is further mapped onto an 2×2×24 tensor 3006 with a 5×5 kernel using a max pool operation. The data is then mapped to another 2×2×24 tensor 3008 using a max pool operation. After the convolution layers, the data is mapped onto a fully connected feed forward layer 3010 of size 500. The data is then mapped onto another fully connected feed forward layer 3012 of size 500. Finally, the data is mapped into the desired outputs 3014 (2 above—contaminated and not contaminated). The output dimension 3014 is dependent on the number of classification results needed. These parameters can be changed for variations of similar results.

As noted above, in certain cases, filamentous and microbiological makeup of water is also important in the paper industry as the presence of filamentous bacteria can degrade the quality of paper that is produced. Once the CNN is properly trained, any lay user can obtain images of a sample using the instant scope in combination with a mobile digital data device or any other image capture device. The mobile digital data device can then run the instant image recognition algorithm to determine if the sample does contain the target foreign body, all remotely in the field without the need for expensive equipment or shipping the sample to a laboratory. If images are captured using an additional image capture device, the device can be wired, or wirelessly, connected to a digital data device for instant identification by feeding the image through the algorithm running on the digital data device, whether locally or networked. Of note, the instant scope and algorithm can be used in a wide variety of settings, including but not limited to paper milling, oil refining, food processing, oil processing, corn milling, processing of starches and sweeteners, processing and manufacturing of organic materials, water treatment industry, beverage processing, breweries and wineries, municipal facilities, institutional building, industries involving water treatment, cooling water, infrastructure, mobile vehicles and infrastructure (e.g., trucks, tankers, shipping containers), and piping asset protection.

For many industrial and manufacturing processes and water treatment processes, filamentous bacteria can begin growing within process water as well as in treatment tanks for wastewater. Excessive numbers of these bacteria can lead to an issue known as bulking, where the bacteria inhibit sludge settling and cause clogs throughout the manufacturing process and treatment process. For industries such as paper manufacturing, the presence of filamentous bacteria can disrupt the structural integrity of the finished product, leading to costly recalls of the product. Individual species of filamentous bacteria require different chemical treatments to eradicate once they have begun to grow in industrial process water. Alternatively, microorganisms are critical in allowing for the breakdown of large molecules and organic materials when it comes to water treatment, therefore it is imperative to have the necessary data to show the current make-up of the microorganisms in the system. However, as discussed throughout the present disclosure, without trained personal or large microscopes, it is difficult to correctly identify the species and thus prevent these critical manufacturing failures. Thus to ensure stable water treatment understanding of the microorganisms in the water treatment process is critical for maintaining uptime and operating at optimal efficiency.

To train the designed CNN, images that are taken by the microscope can be cropped to focus on the sample or region of interest to be identified. Then the image can be resized to 128×128 pixels, for example. Images can be resized to 128×128 pixels for training because images of sample structures under the microscope at that resolution are still distinguishable from each other while still allowing for reducing computation cost and decreasing training time from that of a larger sized image. Image augmentation (ex. rotating, flipping, skewing) of the sample image can also be applied to increase data amount and variation for training. For training, an Adam Optimizer with a learning rate of 0.001 can be used and image data can be trained in batch sizes of 100.

CNNs or Deep Neural Networks (DNN) with modified or different architectures and training processes than those described above can also be used for sample identification of microscopy images coupled with the portable microscope. Those modifications include but are not limited to changing in the number of convolution or connected layers in the model, the size of the layers, the use of different optimizers, optimization rates, activation functions, etc.

Figure 22:
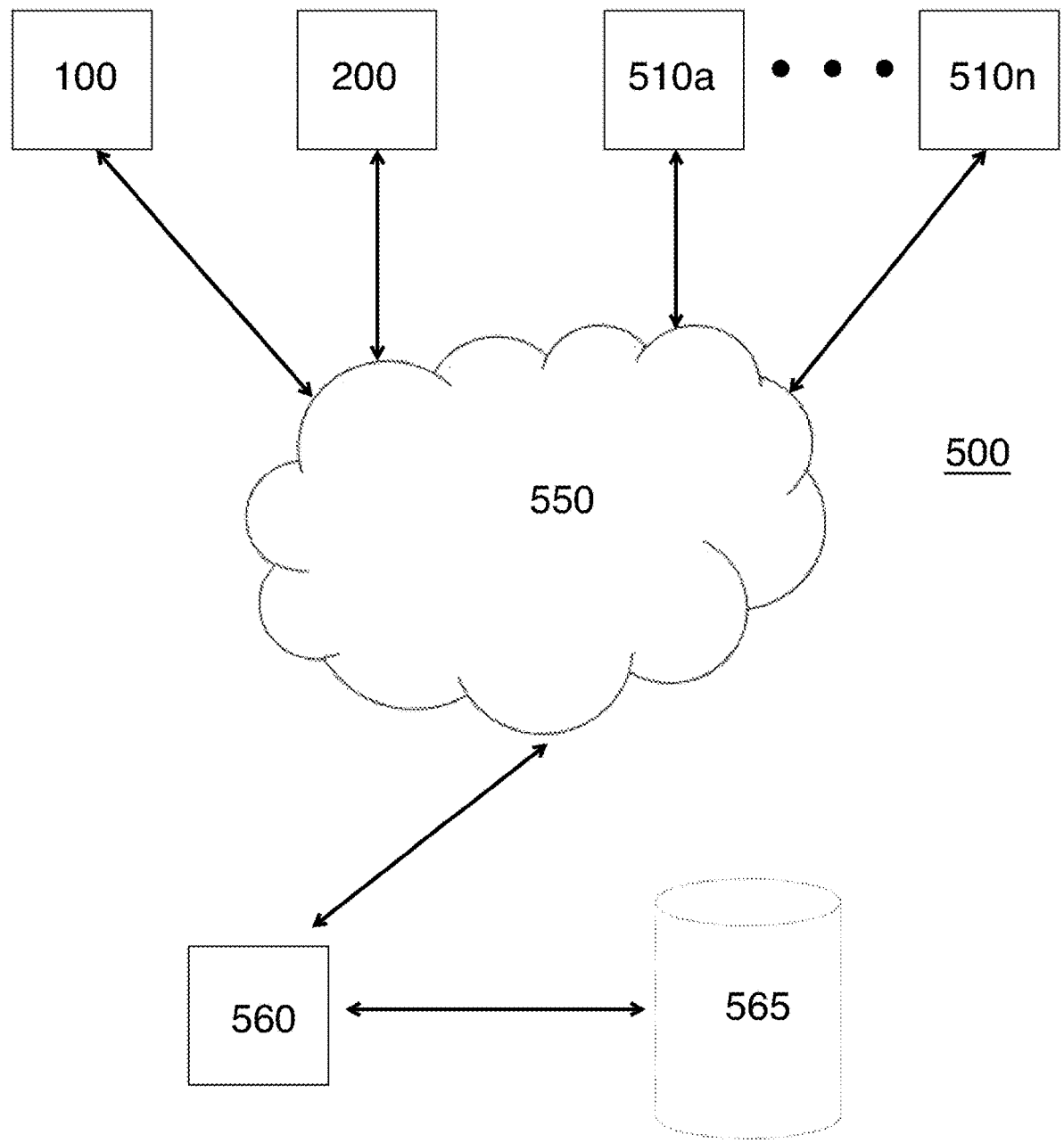
FIG. 22 shows a system according to an exemplary embodiment.

In some embodiments, as shown in FIG. 22, the instant scope 100 and image recognition algorithms, 1000, 2000 can be used alone, or alternatively, can be used in conjunction with other sensors 510a-n and algorithms. For example, an integrated data collection system 500 that can store data from microscopy (100), visual image capture devices/mobile devices 200, sensors 510a-n and other Internet of Things (IoT) devices, as well as other shared data such as weather information, in a remote server or cloud platform 560, and/or a data storage system, or database 565 is contemplated herein. In some exemplary embodiments a plurality of sensors 510a-n can be deployed within a single, or plural, body/bodies of water to collect additional data in "real-time." Such sensors 510a-n can collect live data on water and environmental properties 24 hours a day, seven days a week. The live data can include the water temperature, ammonia levels, phosphorus levels, etc. The sensors 510a-n themselves can be of a heavy duty built quality and include a battery which is capable of continuous use for over a year. The sensors may include radios to wirelessly transmit data via the internet/wireless network/wired network 550 to a central server 560 or a node that is connected to a server for analysis. The data from the plurality of sensors can be combined with data from the aforementioned scope and image recognition algorithms collected by individual users, entities, or state employees. The data may then be processed through a learning algorithm and is then displayed, visualized, or analyzed using algorithms on a platform like but not limited to a software package, website, or application that is easily accessible. This integrated data can be sent from the database 565 and server 560 via the internet 550 to the mobile devices 200, or other computing devices. This integrated data collection and analysis software allows low cost and rapid understanding of the environment as well as insights, recommendations, and predictions for proactive treatment of risks like contamination and more. For example, the data may be aggregated to forecast bacteria blooms before they even occur, though other uses are deemed to be within the scope of the present disclosure. For example, alternatively, or additionally, the processed data may forecast harmful chemical concentrations (such as nitrogen or phosphorus) or other harmful micro-organism blooms.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

The invention claimed is:

1. A portable variable focus microscope, comprising:
   a scope housing including a lumen;
   a lens removably disposed on the scope housing;
   a slide platform, wherein the slide platform is rotationally fixed relative to the scope housing and the slide platform is configured to linearly move within the lumen; and
   a height adjuster configured to rotate within the lumen while being axially fixed relative to the scope housing, wherein rotation of the height adjuster within the scope housing adjusts a relative distance between the slide platform and the lens to adjust a focus of the lens, wherein the slide platform is configured to support a sample.

2. The portable variable focus microscope of claim 1, wherein the scope housing comprises a lower section and an upper section secured together.

3. The portable variable focus microscope of claim 2, wherein the lower section comprises an illumination source.

4. The portable variable focus microscope of claim 2, wherein the upper section comprises at least one lens retention feature extending from an upper surface.

5. The portable variable focus microscope of claim 2, wherein the lower section includes a recess on a lower face and a light source disposed within the recess.

6. The portable variable focus microscope of claim 2, wherein the lower section further includes at least two "C" shaped retention arms extending upward from an upper surface.

7. The portable variable focus microscope of claim 6, wherein the upper section further includes at least two "C" shaped retention arms extending downward from a lower surface of the upper section, wherein the at least two "C" shaped retention arms are mirrored "C" shapes from the "C" shaped retention arms of the lower section, and the lower section and the upper section are secured in an interference fit between the respective "C" shaped retention arms of the upper and lower section.

8. The portable variable focus microscope of claim 1, further comprising a mobile digital data device, wherein the mobile digital data device includes a camera module.

9. The portable variable focus microscope of claim 8, wherein the camera module is disposed on the lens of the portable variable focus microscope without any features to retain the mobile digital data device relative to the lens.

10. The portable variable focus microscope of claim 8, wherein the camera module is configured and arranged to capture an image of a sample through the lens and store the image in the mobile digital data device.

11. The portable variable focus microscope of claim 10, wherein the mobile digital data device includes a controller that is configured and arranged to identify the image of the sample.

12. The portable variable focus microscope of claim 11, wherein the controller is configured and arranged to use a convoluted neural network to perform an image recognition of the image to identify the image of the sample.

13. The portable variable focus microscope of claim 11, wherein the controller is configured and arranged to identify if the sample contains one of cyanobacteria, algal blooms, microplastics, mold, E. coli, salmonella, legionella bacteria, and filamentous bacteria.

14. The portable variable focus microscope of claim 1, wherein the height adjuster is cylindrically shaped.

15. The portable variable focus microscope of claim 1, wherein the height adjuster includes an interior lumen and threads on an interior face, wherein the slide platform includes a threaded neck that is received within the interior lumen of the height adjuster.

16. A method of imaging a sample with a portable variable focus microscope, the method comprising:
    placing the sample within a scope housing of the portable variable focus microscope, wherein the scope housing comprises:
        a lumen; and
        a lens removably disposed on the scope housing;
    linearly moving a slide platform within the lumen, wherein the slide platform is rotationally fixed relative to the scope housing; and
    adjusting a focus of the lens by rotating a height adjuster to adjust a relative distance between the slide platform and the lens, wherein the height adjuster is configured to rotate within the lumen while being axially fixed relative to the scope housing.

17. The method of claim 16, further comprising capturing an image of the sample through the lens.

18. The method of claim 17, further comprising storing the image of the sample in a mobile digital data device, wherein the mobile digital data device comprises a camera module and a controller.

19. The method of claim 18, further comprising performing an image recognition of the image to identify the image of the sample using a convoluted neural network.

20. The method of claim 19, further comprising identifying if the sample contains one of cyanobacteria, algal blooms, microplastics, mold, E. coli, salmonella, legionella bacteria, and filamentous bacteria.

* * * * *